(12) United States Patent
Hsieh et al.

(10) Patent No.: US 9,019,631 B2
(45) Date of Patent: Apr. 28, 2015

(54) OPTICAL LENS ASSEMBLY

(71) Applicant: Largan Precision Co., Ltd., Taichung (TW)

(72) Inventors: Dung-Yi Hsieh, Taichung (TW); Tsung-Han Tsai, Taichung (TW); Wei-Yu Chen, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 157 days.

(21) Appl. No.: 13/652,483

(22) Filed: Oct. 16, 2012

(65) Prior Publication Data

US 2013/0250442 A1  Sep. 26, 2013

(30) Foreign Application Priority Data

Mar. 20, 2012 (TW) .............................. 101109508 A

(51) Int. Cl.
*G02B 15/14* (2006.01)
*G02B 13/18* (2006.01)
*G02B 3/02* (2006.01)
*G02B 13/00* (2006.01)
*G02B 5/20* (2006.01)

(52) U.S. Cl.
CPC .............. *G02B 13/003* (2013.01); *G02B 5/208* (2013.01)

(58) Field of Classification Search
USPC ......... 359/715–717, 668, 764, 771, 772, 795; 348/340, 335, 345, 240.1, 333.08
See application file for complete search history.

(56) References Cited

U.S. PATENT DOCUMENTS

| | | | | |
|---|---|---|---|---|
| 7,265,886 B2 * | 9/2007 | Yoshikawa et al. | ........ | 359/216.1 |
| 8,508,866 B2 * | 8/2013 | Teraoka | ........................ | 359/785 |
| 2006/0061882 A1 | 3/2006 | Sun | | |
| 2007/0121216 A1 * | 5/2007 | Nanba | .......................... | 359/680 |

FOREIGN PATENT DOCUMENTS

| | | |
|---|---|---|
| CN | 101324695 A | 12/2008 |
| CN | 102207605 A | 10/2011 |
| CN | 102221738 A | 10/2011 |
| CN | 202025118 U | 11/2011 |
| CN | 202748525 U | 2/2013 |
| TW | 201126198 A1 | 8/2011 |

* cited by examiner

*Primary Examiner* — Scott J Sugarman
*Assistant Examiner* — Brandi Thomas
(74) *Attorney, Agent, or Firm* — CKC & Partners Co., Ltd.

(57) ABSTRACT

An optical lens assembly includes, in order from an object side to an image side, a first lens element and a second lens element. The first lens element with positive refractive power has an object-side surface being convex at a paraxial region and an image-side surface being concave at a paraxial region. The second lens element with negative refractive power is made of plastic material and has an image-side surface being concave at a paraxial region and being convex at a peripheral region, wherein an object-side surface and the image-side surface of the second lens element are aspheric.

21 Claims, 19 Drawing Sheets

OPTICAL LENS ASSEMBLY

RELATED APPLICATIONS

The application claims priority to Taiwan Application Serial Number 101109508, filed Mar. 20, 2012, which is herein incorporated by reference.

BACKGROUND

1. Technical Field

The present disclosure relates to an optical lens assembly. More particularly, the present disclosure relates to a compact optical lens assembly that is capable of 2D or 3D image applications on electronic devices.

2. Description of Related Art

Thin and portable electronic devices with lens assembly are widely used, such as smart phones, tablet computers and ultrabooks. For applying to the portable electronic devices, the lens assembly with low manufacturing cost and compact size is required. A conventional lens assembly adopts at least three lens elements with refractive power, such as in U.S. Pat. No. 8,094,231 and U.S. Pat. No. 8,089,704. However, the cost and the complexity of manufacturing the lens assembly are relatively high when it comes to keep a compact size with many lens elements.

Although the lens assembly with two lens elements is disclosed, such as in U.S. Pat. No. 7,967,076; however, the chromatic polarization between the short wavelength and the long wavelength cannot be corrected through this lens assembly. Therefore, the image quality of the lens assembly would be limited.

SUMMARY

According to one aspect of the present disclosure, an optical lens assembly includes, in order from an object side to an image side, a first lens element, and a second lens element. The first lens element with positive refractive power has an object-side surface being convex at a paraxial region and an image-side surface being concave at a paraxial region. The second lens element with negative refractive power is made of plastic material and has an image-side surface being concave at a paraxial region and being convex at a peripheral region, wherein an object-side surface and the image-side surface of the second lens element are aspheric. When an Abbe number of the first lens element is V1, an Abbe number of the second lens element is V2, a central thickness of the first lens element is CT1, a central thickness of the second lens element is CT2, a curvature radius of the image-side surface of the first lens element is R2, and a curvature radius of the object-side surface of the second lens element is R3, the following relationships are satisfied:

$$2.0<(V1+V2)/(V1-V2)<5.0;$$

$$1.85<CT2/CT1<4.0; \text{ and}$$

$$-1.5<R3/R2<1.5.$$

According to another aspect of the present disclosure, an optical lens assembly includes, in order from an object side to an image side, a stop, a first lens element, and a second lens element. The first lens element with positive refractive power has an object-side surface being convex at a paraxial region and an image-side surface being concave at a paraxial region. The second lens element with negative refractive power is made of plastic material and has an image-side surface being concave at a paraxial region and being convex at a peripheral region, wherein an object-side surface and the image-side surface of the second lens element are aspheric. When an Abbe number of the first lens element is V1, an Abbe number of the second lens element is V2, a central thickness of the first lens element is CT1, a central thickness of the second lens element is CT2, a curvature radius of the image-side surface of the first lens element is R2, a curvature radius of the object-side surface of the second lens element is R3, an axial distance between the stop and the image-side surface of the second lens element is SD, and an axial distance between the object-side surface of the first lens element and the image-side surface of the second lens element is TD, the following relationships are satisfied:

$$2.0<(V1+V2)/(V1-V2)<5.0;$$

$$1.65<CT2/CT1<4.0;$$

$$-1.5<R3/R2<1.5; \text{ and}$$

$$0.90<SD/TD<1.1.$$

According to yet another aspect of the present disclosure, an optical lens assembly includes, in order from an object side to an image side, a first lens element, and a second lens element. The first lens element with positive refractive power has an object-side surface being convex at a paraxial region and an image-side surface being concave at a paraxial region. The second lens element with negative refractive power is made of plastic material and has an image-side surface being concave at a paraxial region and being convex at a peripheral region, wherein an object-side surface and the image-side surface of the second lens element are aspheric. When an Abbe number of the first lens element is V1, an Abbe number of the second lens element is V2, a central thickness of the first lens element is CT1, a central thickness of the second lens element is CT2, a curvature radius of the image-side surface of the first lens element is R2, a curvature radius of the object-side surface of the second lens element is R3, and a distance in parallel with the optical axis from the on-axis vertex on the image-side surface of the second lens element to the maximum effective diameter position on the image-side surface of the second lens element is SAG22, the following relationships are satisfied:

$$2.0<(V1+V2)/(V1-V2)<5.0;$$

$$1.85<CT2/CT1<4.0;$$

$$-1.5<R3/R2<0; \text{ and}$$

$$-0.60<SAG22/CT2<0.$$

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
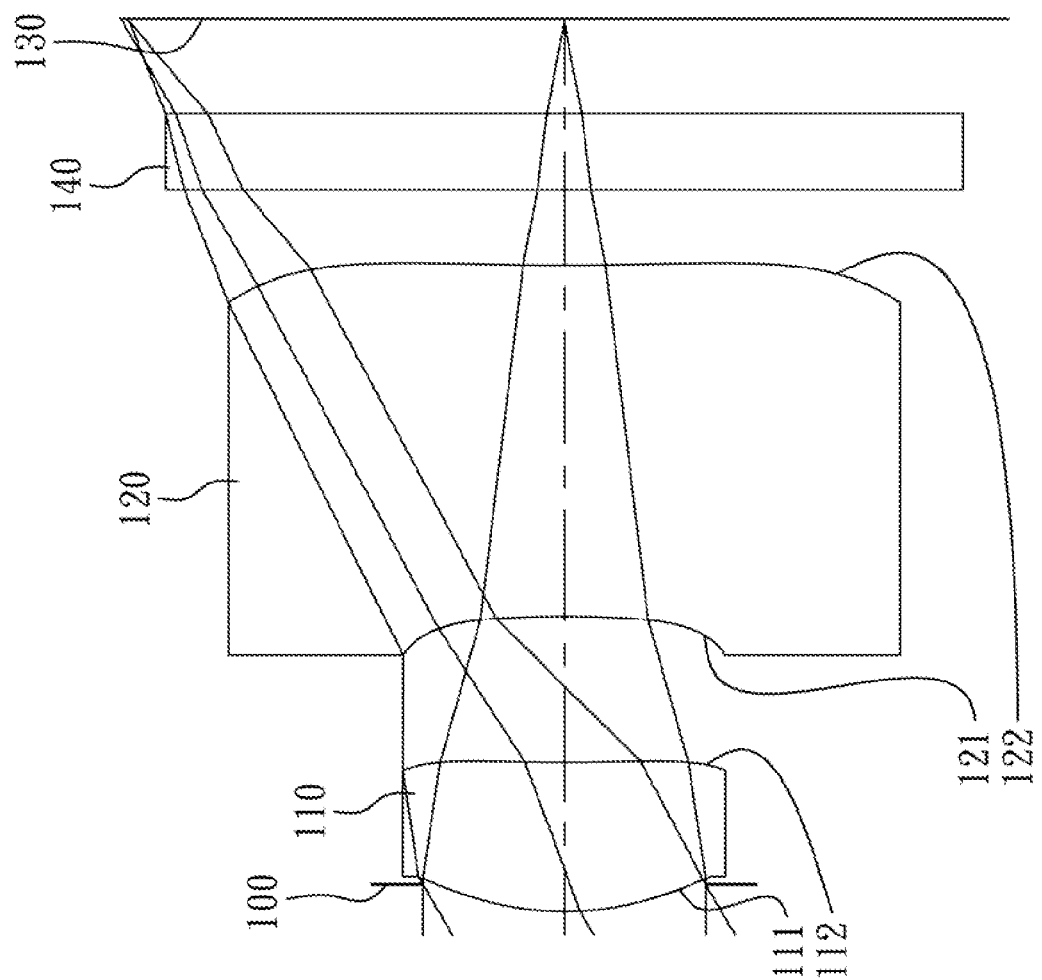
FIG. 1 is a schematic view of an optical lens assembly according to the 1st embodiment of the present disclosure.

An optical lens assembly includes, in order from an object side to an image side, a first lens element and a second lens element.

The first lens element with positive refractive power provides proper positive refractive power for the optical lens assembly. An object-side surface of the first lens element is convex at a paraxial region, and an image-side surface of the first lens element is concave at a paraxial region, so that the total track length of the optical lens assembly can be reduced by adjusting the positive refractive power of the first lens element.

The second lens element with negative refractive power can correct the aberration generated from the first lens element with positive refractive power. An image-side surface of the second lens element is concave at a paraxial region and is convex at a peripheral region, so that the aberration of the peripheral field can be corrected effectively, and the relative illumination at the peripheral region can be enhanced for reducing the severe dropping of brightness or the occurrence of shading at the peripheral region.

When an Abbe number of the first lens element is V1, and an Abbe number of the second lens element is V2, the following relationship is satisfied: $2.0<(V1+V2)/(V1-V2)<5.0$. Therefore, the chromatic polarization generated from the optical lens assembly between the short-wavelength and the long-wavelength can be reduced for enhancing the imaging quality. V1 and V2 can further satisfy the following relationship: $2.0<(V1+V2)/(V1-V2)<3.0$. Preferably, V1 and V2 can satisfy the following relationship: $2.0<(V1+V2)/(V1-V2)<2.6$.

When a central thickness of the first lens element is CT1, and a central thickness of the second lens element is CT2, the following relationship is satisfied: $1.65<CT2/CT1<4.0$. Therefore, the manufacture of the lens elements and the fabrication of the optical lens assembly would be easier. CT1 and CT2 can further satisfy the following relationship: $1.85<CT2/CT1<4.0$. Preferably, CT1 and CT2 can satisfy the following relationship: $2.1<CT2/CT1<4.0$.

When a curvature radius of the image-side surface of the first lens element is R2, and a curvature radius of the object-side surface of the second lens element is R3, the following relationship is satisfied: $-1.5<R3/R2<1.5$. Therefore, the aberration of the first lens element can be corrected by adjusting the curvatures of the image-side surface of the first lens element and the object-side surface of the second lens element. R2 and R3 can further satisfy the following relationship: $-1.5<R3/R2<0$.

The optical lens assembly further includes a stop, such as an aperture stop. When an axial distance between the stop and the image-side surface of the second lens element is SD, and an axial distance between the object-side surface of the first lens element and the image-side surface of the second lens element is TD, the following relationship is satisfied: $0.90<SD/TD<1.10$. Therefore, the optical lens assembly can have a favorable balance between the telecentricity and the wide angle of view for a desirable field of view while keeping the total track of length of the entire assembly from being too long.

When an axial distance between the first lens element and the second lens element is T12, and a focal length of the optical lens assembly is f, the following relationship is satisfied: $0.16<T12/f<0.30$. Therefore, the manufacturing yield of the optical lens assembly can be increased by the proper distance between the first lens element and the second lens element.

When the focal length of the optical lens assembly is f, and a curvature radius of the image-side surface of the second lens element is R4, the following relationship is satisfied: $0.1<f/R4<1.2$. Therefore, the back focal length of the optical lens assembly can be reduced by properly adjusting the curvature of the image-side surface of the second lens element, so as to keep the optical lens assembly compact.

When the focal length of the optical lens assembly is f, and a focal length of the second lens element is f2, the following relationship is satisfied: $-1.2<f/f2<-0.4$. Therefore, the focal length of the second lens element can be adjusted for correcting the aberration generated from the first lens element with positive refractive power.

When a distance in parallel with the optical axis from the on-axis vertex on the image-side surface of the second lens element to the maximum effective diameter position on the image-side surface of the second lens element is SAG22, and the central thickness of the second lens element is CT2, the following relationship is satisfied: $-0.60<SAG22/CT2<0$. Therefore, the thickness and the shape of the image-side surface of the second lens element are favorable for manufacturing and assembling.

According to the optical lens assembly of the present disclosure, the lens elements thereof can be made of plastic or glass materials. When the lens elements are made of glass material, the allocation of the refractive power of the optical lens assembly may be more flexible and easier to design. When the lens elements are made of plastic material, the manufacturing cost can be effectively reduced. Furthermore, the surface of each lens element can be aspheric, so that it is easier to make the surface into non-spherical shapes. As a result, more controllable variables are obtained for reducing the aberration, and the number of required lens elements for constructing an optical lens assembly can be reduced. Therefore, the total track length of the optical lens assembly can also be reduced.

According to the optical lens assembly of the present disclosure, when a lens element has a convex surface, it indicates that a surface is convex at a paraxial region; and when a lens element has a concave surface, it indicates that concave surface is concave at a paraxial region.

According to the optical lens assembly of the present disclosure, the optical lens assembly can include at least one stop, such as an aperture stop, a glare stop or a field stop. Said glare stop or said field stop is for eliminating the stray light and thereby improving the image resolution thereof.

In the present optical lens assembly, an aperture stop can be configured as a front stop or a middle stop. A front stop can provide a longer distance between an exit pupil of the system and an image plane and which improves the image-sensing efficiency of an image sensor. A middle stop is favorable for enlarging the field of view of the system and thereby provides a wider field of view for the same.

According to the above description of the present disclosure, the following 1st-9th specific embodiments are provided for further explanation.

1st Embodiment

Figure 2:
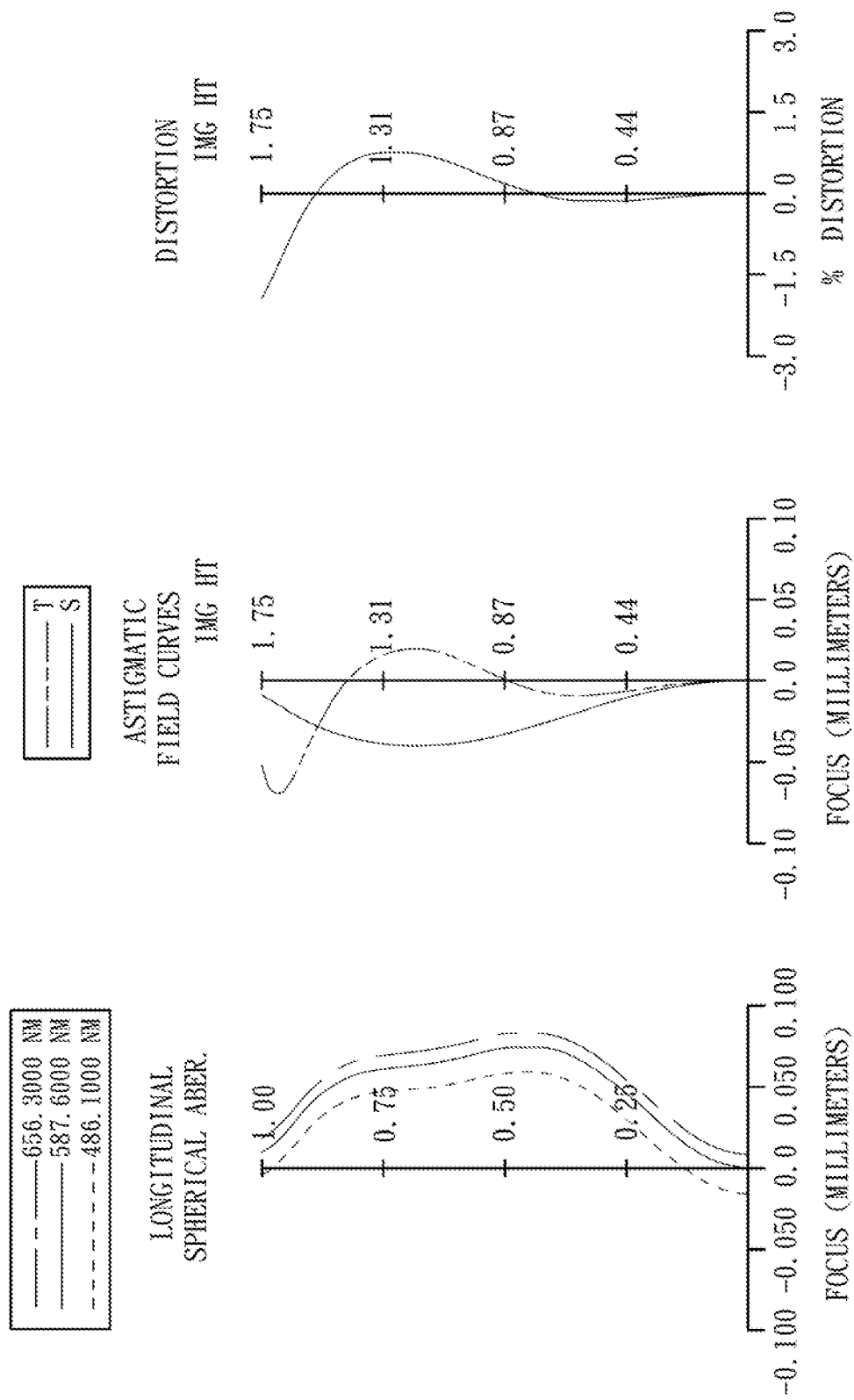
FIG. 2 shows spherical aberration curves, astigmatic field curves and a distortion curve of the optical lens assembly according to the 1st embodiment.

FIG. 1 is a schematic view of an optical lens assembly according to the 1st embodiment of the present disclosure. FIG. 2 shows spherical aberration curves, astigmatic field curves and a distortion curve of the optical lens assembly according to the 1st embodiment. In FIG. 1, the optical lens assembly includes, in order from an object side to an image side, an aperture stop 100, the first lens element 110, the second lens element 120, an IR-cut filter 140, and an image plane 130.

The first lens element 110 with positive refractive power has an object-side surface 111 being convex at a paraxial region and an image-side surface 112 being concave at a paraxial region. The first lens element 110 is made of plastic material with the object-side surface 111 and the image-side surface 112 being aspheric.

The second lens element 120 with negative refractive power has an object-side surface 121 being concave at a paraxial region, and an image-side surface 122 being concave at a paraxial region and being convex at a peripheral region. The second lens element 120 is made of plastic material with the object-side surface 121 and the image-side surface 122 being aspheric.

The IR-cut filter 140 is made of glass material, wherein the IR-cut filter 140 is located between the second lens element 120 and the image plane 130, and will not affect the focal length of the optical lens assembly.

The equation of the aspheric surface profiles of the aforementioned lens elements of the 1st embodiment is expressed as follows:

$$X(Y) = (Y^2/R)/(1 + sqrt(1-(1+k)\times(Y/R)^2)) + \sum_i (Ai)\times(Y^i)$$

wherein,

X is the relative distance between a point on the aspheric surface spaced at a distance Y from the optical axis and the tangential plane at the aspheric surface vertex on the optical axis;

Y is the distance from the point on the curve of the aspheric surface to the optical axis;

R is the curvature radius;

k is the conic coefficient; and

Ai is the i-th aspheric coefficient.

In the optical lens assembly according to the 1st embodiment, when a focal length of the optical lens assembly is f, an f-number of the optical lens assembly is Fno, and half of the maximal field of view is HFOV, these parameters have the following values:

$f=2.93$ mm;

$Fno=2.70$; and $HFOV=30.9$ degrees.

In the optical lens assembly according to the 1st embodiment, when an Abbe number of the first lens element 110 is V1, and an Abbe number of the second lens element 120 is V2, the following relationship is satisfied:

$(V1+V2)/(V1-V2)=2.23$.

In the optical lens assembly according to the 1st embodiment, when a central thickness of the first lens element 110 is CT1, and a central thickness of the second lens element 120 is CT2, the following relationship is satisfied:

$CT2/CT1=2.31$.

In the optical lens assembly according to the 1st embodiment, when a curvature radius of the image-side surface 112 of the first lens element 110 is R2, and a curvature radius of the object-side surface 121 of the second lens element 120 is R3, the following relationship is satisfied:

$R3/R2=-0.16$.

In the optical lens assembly according to the 1st embodiment, when the focal length of the optical lens assembly is f, and a focal length of the second lens element 120 is f2, the following relationship is satisfied:

$f/f2=-0.71$.

In the optical lens assembly according to the 1st embodiment, when an axial distance between the first lens element 110 and the second lens element 120 is T12, and the focal length of the optical lens assembly is f, the following relationship is satisfied:

$T12/f=0.19$.

In the optical lens assembly according to the 1st embodiment, when an axial distance between the aperture stop 100 and the image-side surface 122 of the second lens element 120 is SD, and an axial distance between the object-side surface 111 of the first lens element 110 and the image-side surface 122 of the second lens element 120 is TD, the following relationship is satisfied:

$SD/TD=0.96$.

In the optical lens assembly according to the 1st embodiment, when the focal length of the optical lens assembly is f, and a curvature radius of the image-side surface 122 of the second lens element 120 is R4, the following relationship is satisfied:

$$f/R4 = 0.45.$$

Figure 19:
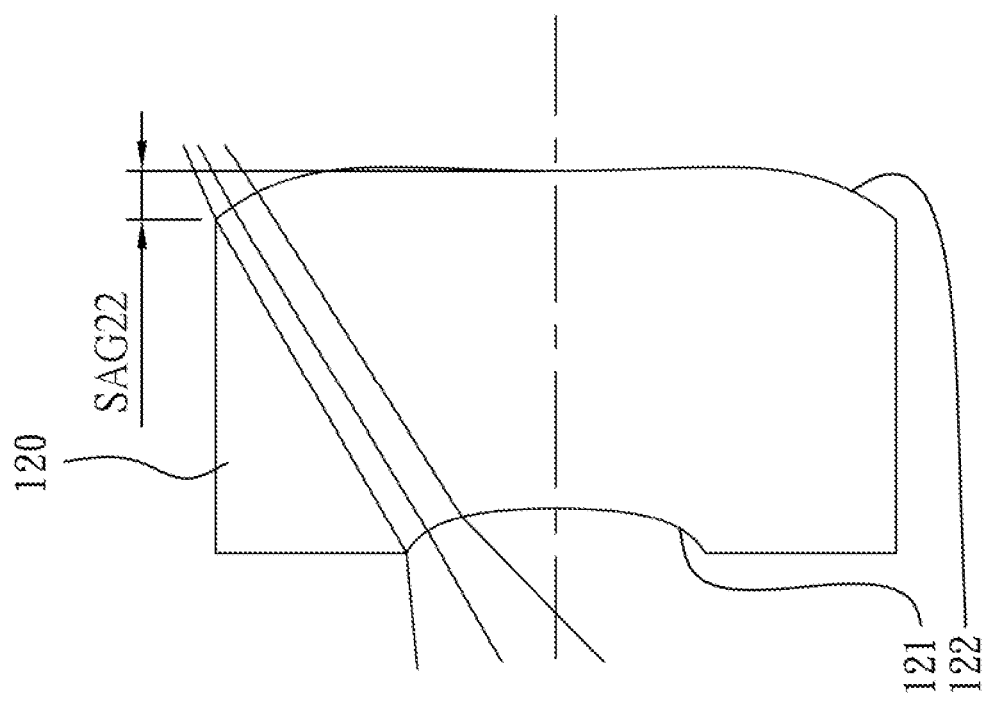
FIG. 19 is a schematic view shows a distance in parallel with the optical axis from the maximum effective diameter position on the image-side surface of the second lens element to the on-axis vertex on the image-side surface of the second lens element according to the optical lens assembly of FIG. 1.

FIG. 19 is a schematic view shows a distance in parallel with the optical axis from the on-axis vertex on the image-side surface 122 of the second lens element 120 to the maximum effective diameter position on the image-side surface 122 of the second lens element 120 according to the optical lens assembly of FIG. 1. In FIG. 19, when a distance in parallel with the optical axis from the on-axis vertex on the image-side surface 122 of the second lens element 120 to the maximum effective diameter position on the image-side surface 122 of the second lens element 120 is SAG22, and a central thickness of the second lens element 120 is CT2, the following relationship is satisfied:

$$SAG22/CT2 = -0.10.$$

The detailed optical data of the 1st embodiment are shown in Table and the aspheric surface data are shown in Table 2 below.

2nd Embodiment

Figure 3:
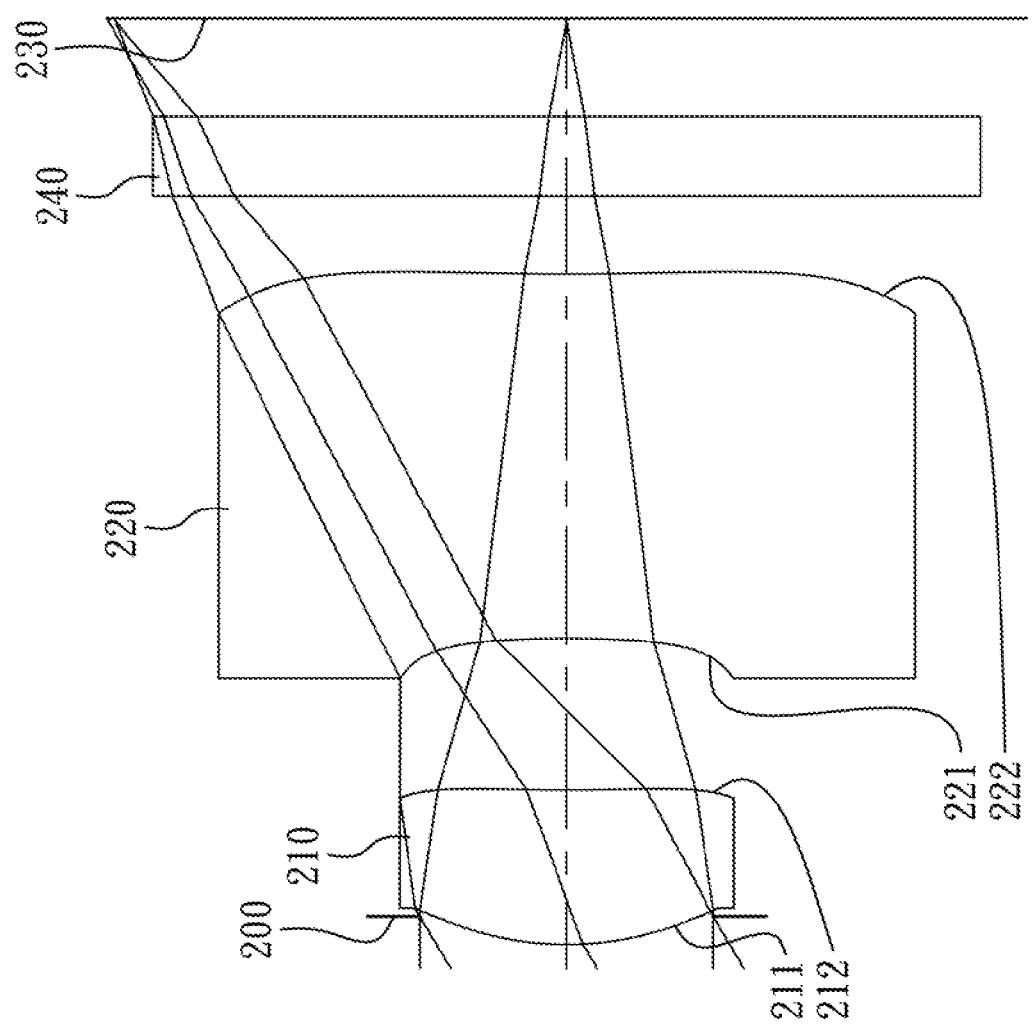
FIG. 3 is a schematic view of an optical lens assembly according to the 2nd embodiment of the present disclosure.
Figure 4:
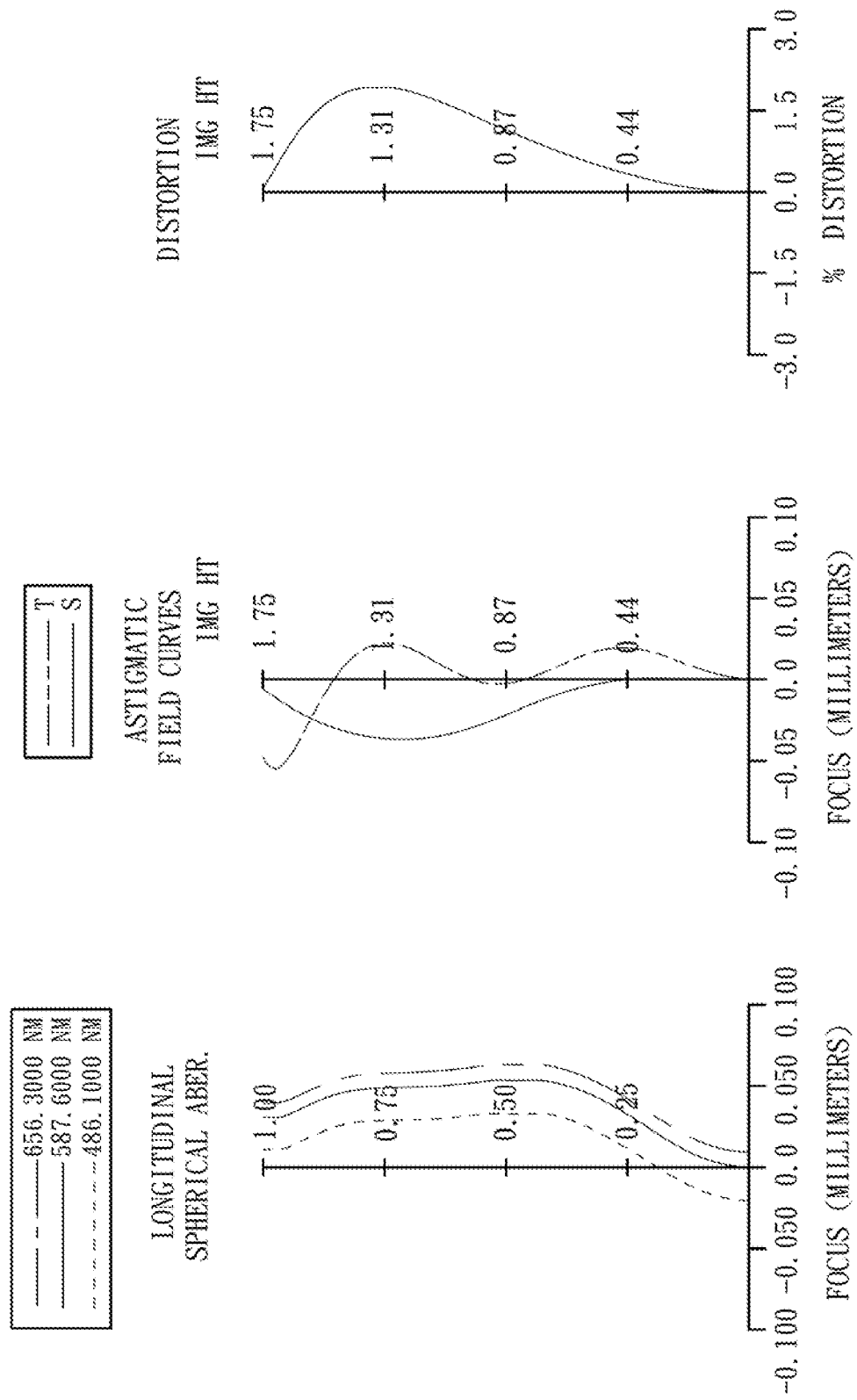
FIG. 4 shows spherical aberration curves, astigmatic field curves and a distortion curve of the optical lens assembly according to the 2nd embodiment.

FIG. 3 is a schematic view of an optical lens assembly according to the 2nd embodiment of the present disclosure. FIG. 4 shows spherical aberration curves, astigmatic field curves and a distortion curve of the optical lens assembly according to the 2nd embodiment. In FIG. 3, the optical lens assembly includes, in order from an object side to an image side, an aperture stop 200, the first lens element 210, the second lens element 220, an IR-cut filter 240, an image plane 230.

The first lens element 210 with positive refractive power has an object-side surface 211 being convex at a paraxial region and an image-side surface 212 being concave at a paraxial region. The first lens element 210 is made of plastic material with the object-side surface 211 and the image-side surface 212 being aspheric.

The second lens element 220 with negative refractive power has an object-side surface 221 being concave at a paraxial region, and an image-side surface 222 being concave at a paraxial region and being convex at a peripheral region.

TABLE 1

1st Embodiment
f = 2.93 mm, Fno = 2.70, HFOV = 30.9 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Ape. Stop | Plano | −0.098 | | | | |
| 2 | Lens 1 | 1.169 (ASP) | 0.617 | Plastic | 1.535 | 56.3 | 2.26 |
| 3 | | 31.250 (ASP) | 0.542 | | | | |
| 4 | Lens 2 | −4.906 (ASP) | 1.426 | Plastic | 1.650 | 21.4 | −4.11 |
| 5 | | 6.528 (ASP) | 0.300 | | | | |
| 6 | IR-cut filter | Plano | 0.200 | Glass | 1.517 | 64.2 | — |
| 7 | | Plano | 0.385 | | | | |
| 8 | Image | Plano | — | | | | |

Reference wavelength (d-line) is 587.6 nm

TABLE 2

Aspheric Coefficients

| Surface # | 2 | 3 | 4 | 5 |
|---|---|---|---|---|
| k = | −1.4140E+00 | −1.0000E+00 | −1.5582E+01 | −3.0000E+01 |
| A4 = | −9.7597E−02 | −1.3150E−01 | −4.6681E−01 | −1.2441E−01 |
| A6 = | 1.6556E+00 | −8.9360E−01 | 5.5022E−01 | 1.6275E−01 |
| A8 = | −1.0401E+01 | 1.7536E+00 | −7.5208E+00 | −2.2289E−01 |
| A10 = | 2.7814E+01 | −3.3903E+00 | 2.5377E+01 | 1.6750E−01 |
| A12 = | −3.0023E+01 | 1.1591E+00 | −4.1918E+01 | −6.8098E−02 |
| A14 = | | | | 1.1267E−02 |

In Table 1, the curvature radius, the thickness and the focal length are shown in millimeters (mm). Surface numbers 0-8 represent the surfaces sequentially arranged from the object-side to the image-side along the optical axis. In Table 2, k represents the conic coefficient of the equation of the aspheric surface profiles. A1-A14 represent the aspheric coefficients ranging from the 1st order to the 14th order. This information related to Table 1 and Table 2 applies also to the Tables for the remaining embodiments, and so an explanation in this regard will not be provided again.

The second lens element 220 is made of plastic material with the object-side surface 221 and the image-side surface 222 being aspheric.

The IR-cut filter 240 is made of glass material, wherein the IR-cut filter 240 is located between the second lens element 220 and the image plane 230, and will not affect the focal length of the optical lens assembly.

The detailed optical data of the 2nd embodiment are shown in Table 3 and the aspheric surface data are shown in Table 4 below,

TABLE 3

2nd Embodiment
f = 2.96 mm, Fno = 2.65, HFOV = 30.2 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Ape. Stop | Plano | −0.107 | | | | |
| 2 | Lens 1 | 1.166 (ASP) | 0.589 | Plastic | 1.544 | 55.9 | 2.39 |
| 3 | | 9.266 (ASP) | 0.575 | | | | |
| 4 | Lens 2 | −5.978 (ASP) | 1.385 | Plastic | 1.640 | 23.3 | −5.72 |
| 5 | | 10.307 (ASP) | 0.300 | | | | |
| 6 | IR-cut filter | Plano | 0.300 | Glass | 1.517 | 64.2 | — |
| 7 | | Plano | 0.377 | | | | |
| 8 | Image | Plano | — | | | | |

Reference wavelength (d-line) is 587.6 nm.

TABLE 4

Aspheric Coeffieients

| Surface # | 2 | 3 | 4 | 5 |
|---|---|---|---|---|
| k = | −1.0163E+00 | −1.0000E+00 | −3.0000E+01 | −3.0000E+01 |
| A4 = | −6.0455E−02 | −1.3625E−01 | −5.1245E−01 | −8.0194E−02 |
| A6 = | 9.4695E−01 | −4.3123E−01 | 1.8476E+00 | 7.9435E−02 |
| A8 = | −5.7706E+00 | 6.9440E−01 | −1.4435E+01 | −1.2767E−01 |
| A10 = | 1.4825E+01 | −2.6829E+00 | 4.2756E+01 | 1.0061E−01 |
| A12 = | −1.5991E+01 | 1.6853E+00 | −5.5013E+01 | −4.2444E−02 |
| A14 = | | | | 7.2383E−03 |

In the optical lens assembly according to the 2nd embodiment, the definitions of f, Fno, HFOV, V1, V2, CT1, CT2, R2, R3, R4, f2, T12, SD, TD, and SAG22 are the same as those stated in the 1st embodiment with corresponding values for the 2nd embodiment. Moreover, these parameters can be calculated from Table 3 and Table 4 as the following values and satisfy the following relationships:

| | |
|---|---|
| f [mm] | 2.96 |
| Fno | 2.65 |
| HFOV [deg.] | 30.2 |
| (V1 + V2)/(V1 − V2) | 2.43 |
| CT2/CT1 | 2.35 |
| R3/R2 | −0.65 |
| f/f2 | −0.52 |
| T12/f | 0.20 |
| SD/TD | 0.96 |
| f/R4 | 0.29 |
| SAG22/CT2 | −0.11 |

3rd Embodiment

Figure 5:
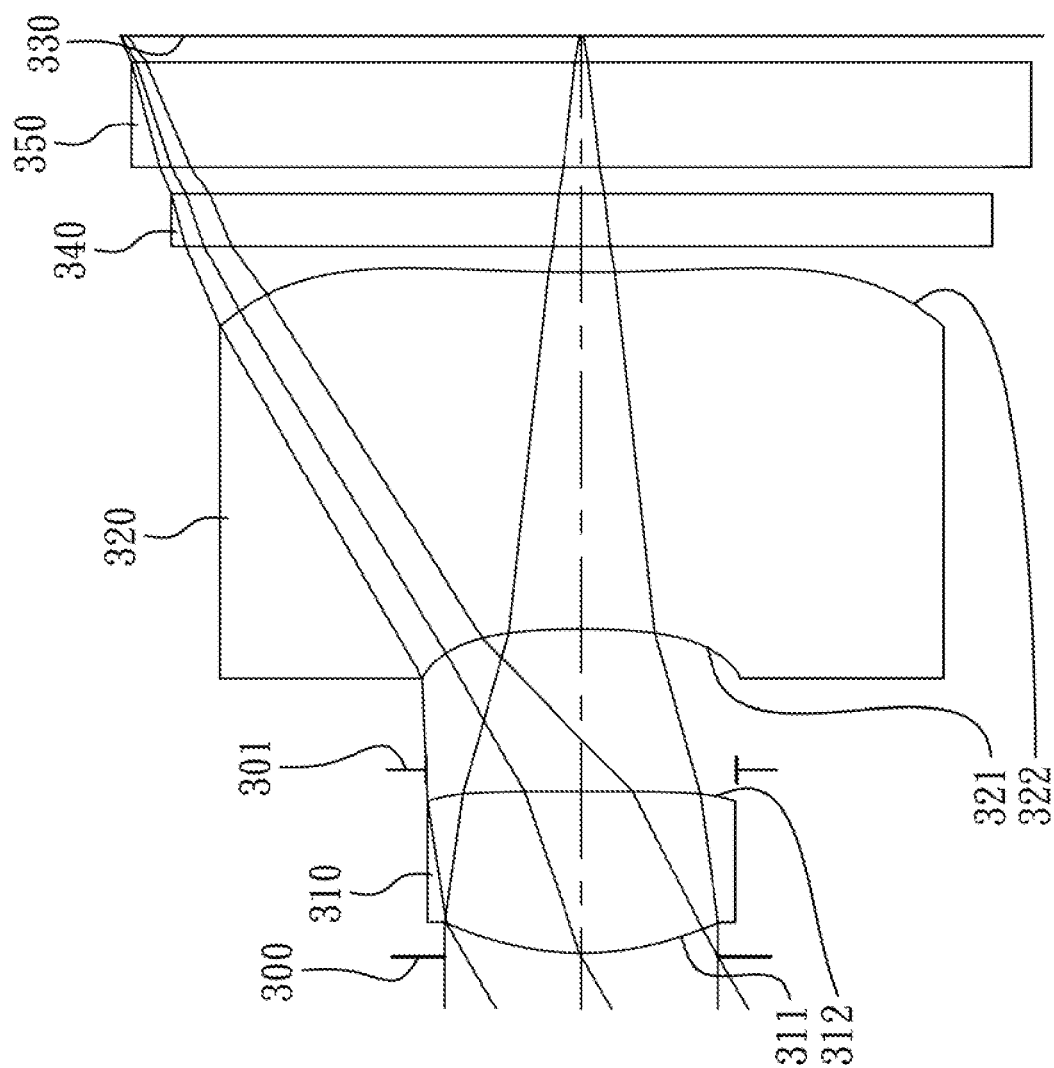
FIG. 5 is a schematic view of an optical lens assembly according to the 3rd embodiment of the present disclosure.
Figure 6:
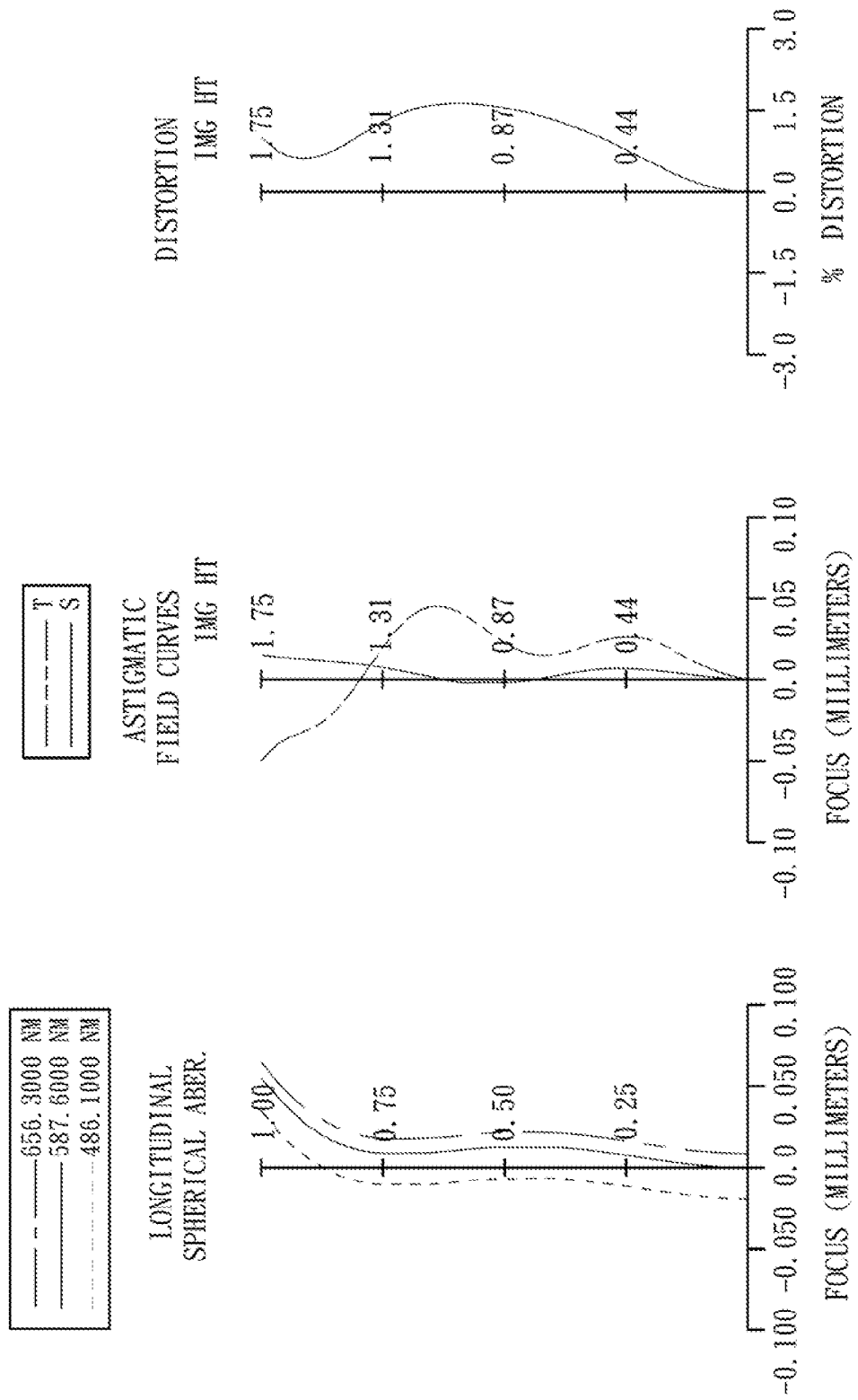
FIG. 6 shows spherical aberration curves, astigmatic field curves and a distortion curve of the optical lens assembly according to the 3rd embodiment.

FIG. 5 is a schematic view of an optical lens assembly according to the 3rd embodiment of the present disclosure. FIG. 6 shows spherical aberration curves, astigmatic field curves and a distortion curve of the optical lens assembly according to the 3rd embodiment. In FIG. 5, the optical lens assembly includes, in order from an object side to an image side, an aperture stop 300, the first lens element 310, a stop 301, the second lens element 320, an IR-cut filter 340, a cover glass 350, and an image plane 330

The first lens element 310 with positive refractive power has an object-side surface 311 being convex at a paraxial region and an image-side surface 312 being concave at a paraxial region. The first lens element 310 is made of plastic material with the object-side surface 311 and the image-side surface 312 being aspheric.

The second lens element 320 with negative refractive power has an object-side surface 321 being concave at a paraxial region and an image-side surface 322 being concave at a paraxial region and being convex at a peripheral region. The second lens element 320 is made of plastic material with the object-side surface 321 and the image-side surface 322 being aspheric.

The IR-cut filter 340 is made of glass material, wherein the IR-cut filter 340 is located between the second lens element 320 and the image plane 330. The cover glass 350 is located between the IR-cut filter 340 and the image plane 330, and the IR-cut filter 340 and the cover glass 350 will not affect the focal length of the optical lens assembly.

The detailed optical data of the 3rd embodiment are shown in Table 5 and the aspheric surface data are shown in Table 6 below.

TABLE 5

3rd Embodiment
f = 2.98 mm, Fno = 2.87, HFOV = 30.1 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Ape. Stop | Plano | 0.014 | | | | |

TABLE 5-continued

3rd Embodiment
f = 2.98 mm, Fno = 2.87, HFOV = 30.1 deg.

| Surface # | | Curvature Radius | Thickness | Material | Index | Abbe # | Focal Length |
|---|---|---|---|---|---|---|---|
| 2 | Lens 1 | 1.153 (ASP) | 0.614 | Plastic | 1.544 | 55.9 | 2.14 |
| 3 | | 100.000 (ASP) | 0.084 | | | | |
| 4 | Stop | Plano | 0.535 | | | | |
| 5 | Lens 2 | −2.966 (ASP) | 1.357 | Plastic | 1.640 | 23.3 | −3.17 |
| 6 | | 7.519 (ASP) | 0.100 | | | | |
| 7 | IR-cut filter | Plano | 0.200 | Glass | 1.517 | 64.2 | — |
| 8 | | Plano | 0.100 | | | | |
| 9 | Cover-glass | Plano | 0.400 | Glass | 1.517 | 64.2 | — |
| 10 | | Plano | 0.101 | | | | |
| 11 | Image | Plano | — | | | | |

Reference wavelength (d-line) is 587.6 nm.
Effective radius of surface 4 is 0.590 mm

TABLE 6

Aspheric Coefficients

| Surface # | 2 | 3 | 5 | 6 |
|---|---|---|---|---|
| k = | −6.5677E−01 | −9.0000E+01 | 1.9379E+01 | 2.5221E+01 |
| A4 = | −1.8904E−02 | −1.4519E−01 | −4.7383E−01 | −5.7630E−02 |
| A6 = | 9.7788E−02 | −5.1867E−01 | 1.9158E+00 | −7.6879E−02 |
| A8 = | −1.1837E+00 | 1.2431E+00 | −1.8302E+01 | 8.1519E−02 |
| A10 = | 2.2328E+00 | −5.4531E+00 | 6.2488E+01 | −5.8352E−02 |
| A12 = | −4.2258E+00 | 5.1748E+00 | −8.8622E+01 | 2.2279E−02 |
| A14 = | | | | −3.6043E−03 |

In the optical lens assembly according to the 3rd embodiment, the definitions of f, Fno, HFOV, V1, V2, CT1, CT2, R2, R3, R4, f2, T12, SD, TD, and SAG22 are the same as those stated in the 1st embodiment with corresponding values for the 3rd embodiment. Moreover, these parameters can be calculated from Table 5 and Table 6 as the following values and satisfy the following relationships:

| | |
|---|---|
| f [mm] | 2.98 |
| Fno | 2.87 |
| HFOV [deg.] | 30.1 |
| (V1 + V2)/(V1 − V2) | 2.43 |
| CT2/CT1 | 2.21 |
| R3/R2 | −0.03 |
| f/f2 | −0.94 |
| T12/f | 0.21 |
| SD/TD | 1.01 |
| f/R4 | 0.40 |
| SAG22/CT2 | −0.34 |

4th Embodiment

Figure 7:
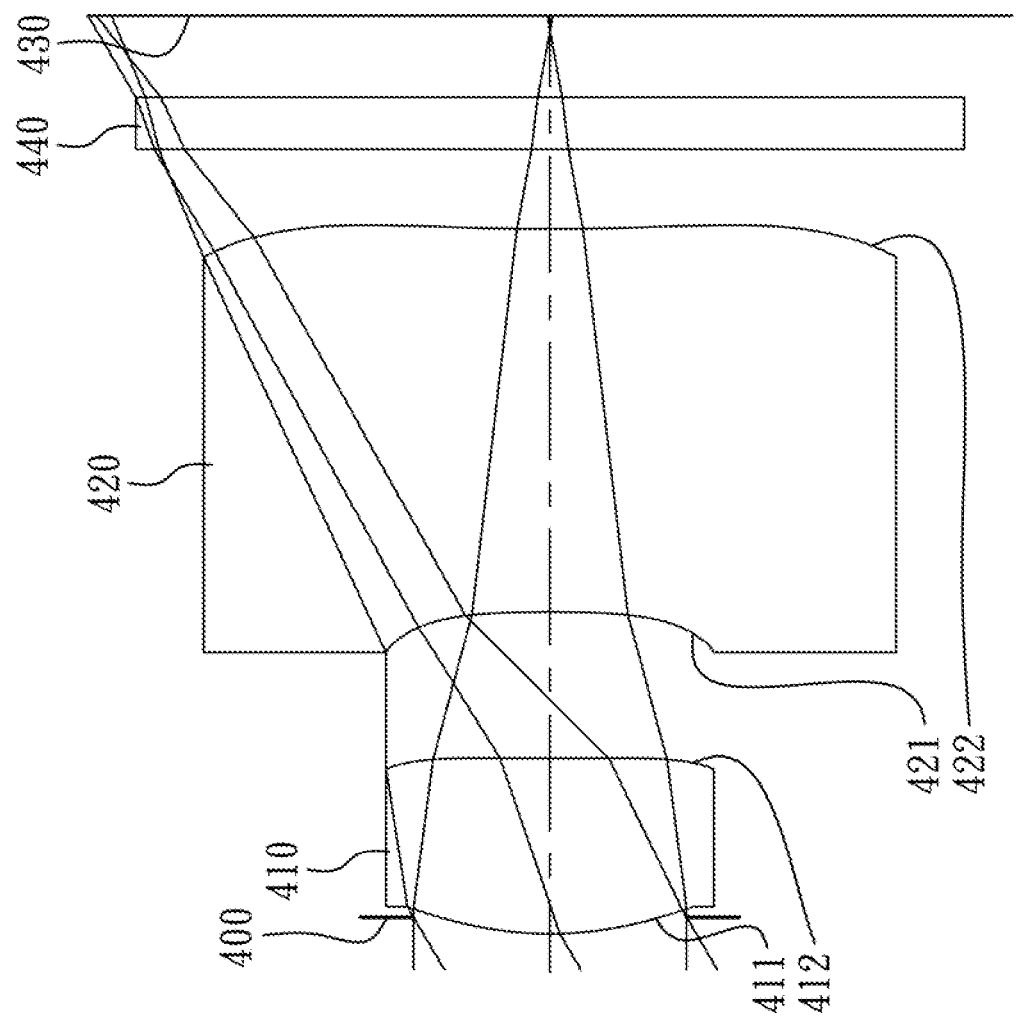
FIG. 7 is a schematic view of an optical lens assembly according to the 4th embodiment of the present disclosure.
Figure 8:
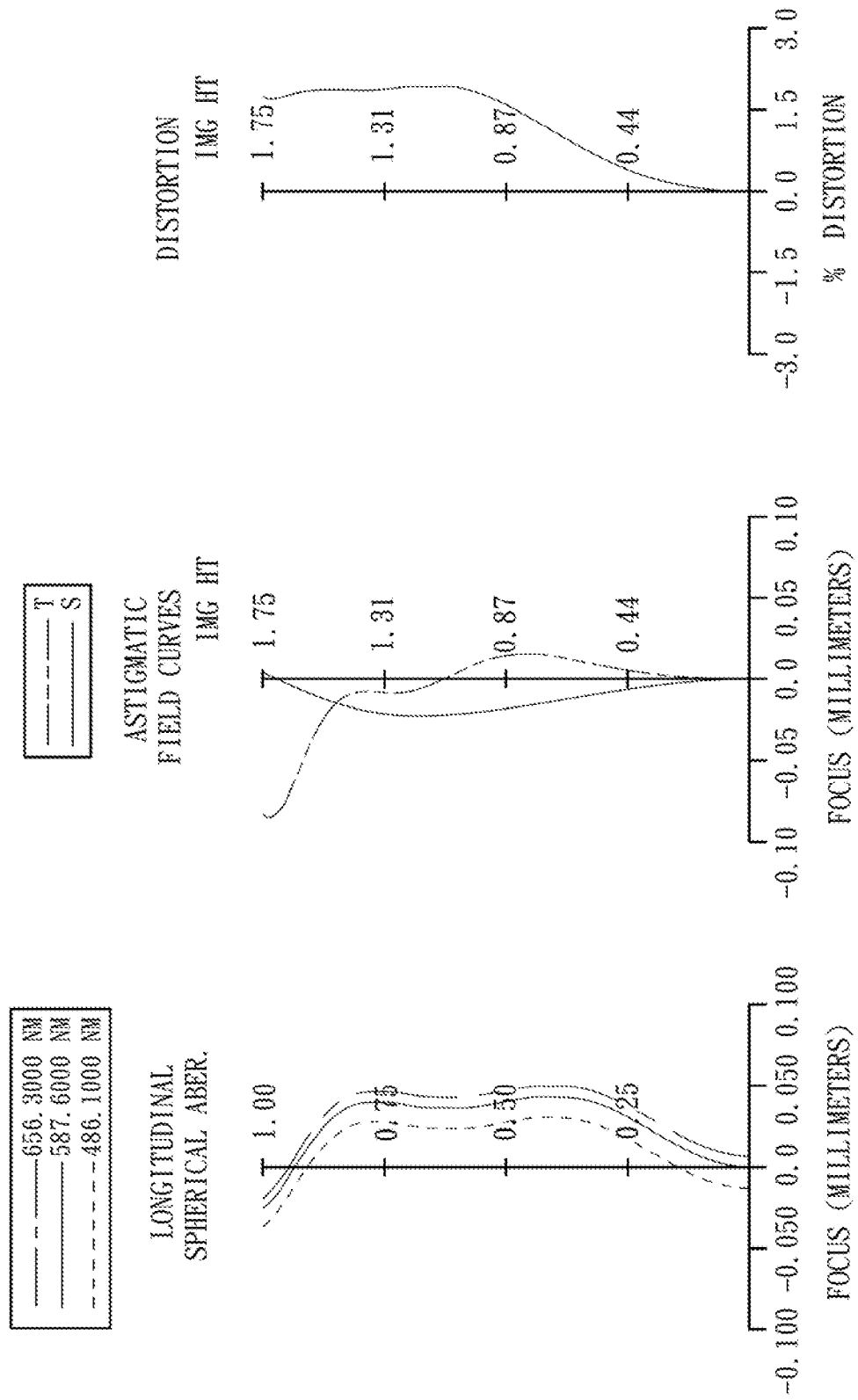
FIG. 8 shows spherical aberration curves, astigmatic field curves and a distortion curve of the optical lens assembly according to the 4th embodiment.

FIG. 7 is a schematic view of an optical lens assembly according to the 4th embodiment of the present disclosure. FIG. 8 shows spherical aberration curves, astigmatic field curves and a distortion curve of the optical lens assembly according to the 4th embodiment. In FIG. 7, the optical lens assembly includes, in order from an object side to an image side, an aperture stop 400, the first lens element 410, the second lens element 420, an IR-cut filter 440, and an image plane 430.

The first lens element 410 with positive refractive power has an object-side surface 411 being convex at a paraxial region and an image-side surface 412 being concave at a paraxial region. The first lens element 410 is made of glass material with the object-side surface 411 and the image-side surface 412 being aspheric.

The second lens element 420 with negative refractive power has an object-side surface 421 being concave at a paraxial region and an image-side surface 422 being concave at a paraxial region and being convex at a peripheral region. The second lens element 420 is made of plastic material with the object-side surface 421 and the image-side surface 422 being aspheric.

The IR-cut filter 440 is made of glass material, wherein the IR-cut filter 440 is located between the second lens element 420 and the image plane 430, and will not affect the focal length of the optical lens assembly.

The detailed optical data of the 4th embodiment are shown in Table 7 and the aspheric surface data are shown in Table 8 below.

TABLE 7

4th Embodiment
f = 2.89 mm, Fno = 2.80, HFOV = 30.4 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Ape. Stop | Plano | −0.063 | | | | |

TABLE 7-continued

4th Embodiment
f = 2.89 mm, Fno = 2.80, HFOV = 30.4 deg.

| Surface # | | Curvature Radius | Thickness | Material | Index | Abbe # | Focal Length |
|---|---|---|---|---|---|---|---|
| 2 | Lens 1 | 1.360 (ASP) | 0.665 | Glass | 1.632 | 63.8 | 2.28 |
| 3 | | 19.047 (ASP) | 0.555 | | | | |
| 4 | Lens 2 | −4.924 (ASP) | 1.451 | Plastic | 1.640 | 23.3 | −4.63 |
| 5 | | 8.296 (ASP) | 0.300 | | | | |
| 6 | IR-cut filter | Plano | 0.200 | Glass | 1.517 | 64.2 | — |
| 7 | | Plano | 0.309 | | | | |
| 8 | Image | Plano | — | | | | |

Reference wavelength (d-line) is 587.6 nm.

TABLE 8

Aspheric Coefficients

| Surface # | 2 | 3 | 4 | 5 |
|---|---|---|---|---|
| k = | −1.2971E+00 | −1.0000E+00 | −2.7236E+01 | −3.0000E+01 |
| A4 = | −9.8882E−02 | −1.5644E−01 | −4.3419E−01 | −6.0179E−02 |
| A6 = | 1.5090E+00 | −7.4159E−01 | −1.6611E−01 | 5.8929E−02 |
| A8 = | −1.1347E+01 | 2.5900E+00 | −2.5554E+00 | −1.5864E−01 |
| A10 = | 3.6049E+01 | −7.1605E+00 | 9.8257E+00 | 1.5740E−01 |
| A12 = | −4.3230E+01 | 5.7900E+00 | −2.2133E+01 | −7.1201E−02 |
| A14 = | | | | 1.2164E−02 |

In the optical lens assembly according to the 4th embodiment, the definitions of f, Fno, HFOV, V1, V2, CT1, CT2, R2, R3, R4, f2, T12, SD, TD, and SAG22 are the same as those stated in the 1st embodiment with corresponding values for the 4th embodiment. Moreover, these parameters can be calculated from Table 7 and Table 8 as the following values and satisfy the following relationships:

| f [mm] | 2.88 |
|---|---|
| Fno | 2.80 |
| HFOV [deg.] | 30.4 |
| (V1 + V2)/(V1 − V2) | 2.15 |
| CT2/CT1 | 2.19 |
| R3/R2 | −0.26 |
| f/f2 | −0.63 |
| T12/f | 0.19 |
| SD/TD | 0.98 |
| f/R4 | 0.35 |
| SAG22/CT2 | −0.08 |

5th Embodiment

Figure 9:
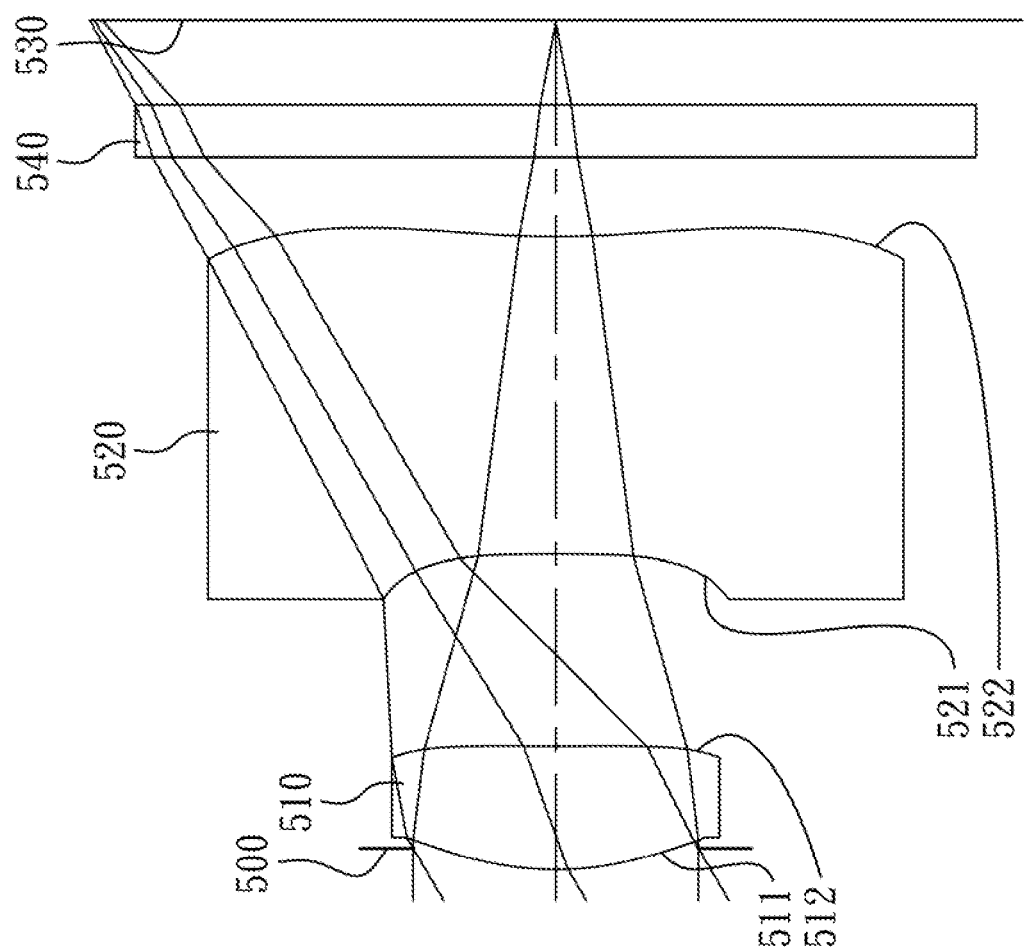
FIG. 9 is a schematic view of an optical lens assembly according to the 5th embodiment of the present disclosure.
Figure 10:
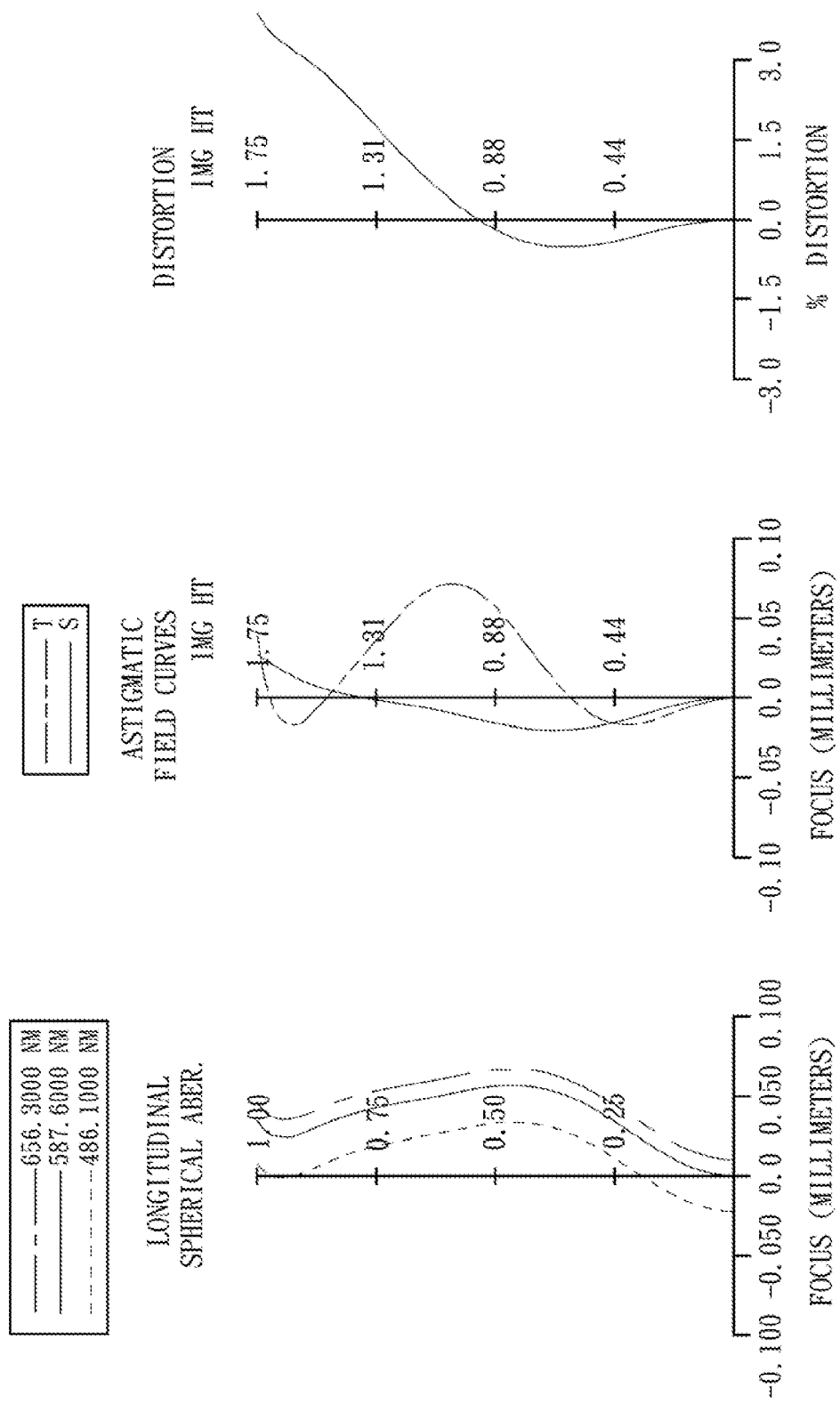
FIG. 10 shows spherical aberration curves, astigmatic field curves and a to distortion curve of the optical lens assembly according to the 5th embodiment.

FIG. 9 is a schematic view of an optical lens assembly according to the 5th embodiment of the present disclosure. FIG. 10 shows spherical aberration curves, astigmatic field curves and a distortion curve of the optical lens assembly according to the 5th embodiment. In FIG. 9, the optical lens assembly includes, in order from an object side to an image side, an aperture stop 500, the first lens element 510, the second lens element 520, an IR-cut filter 640, and an image plane 530.

The first lens element 510 with positive refractive power has an object-side surface 511 being convex at a paraxial region and an image-side surface 512 being concave at a paraxial region. The first lens element 510 is made of plastic material with the object-side surface 511 and the image-side surface 512 being aspheric.

The second lens element 520 with negative refractive power has an object-side surface 521 being concave at a paraxial region and an image-side surface 522 being concave at a paraxial region and being convex at a peripheral region. The second lens element 520 is made of plastic material with the object-side surface 521 and the image-side surface 522 being aspheric.

The IR-cut filter 540 is made of glass material, wherein the IR-cut filter 540 is located between the second lens element 520 and the image plane 530, and will not affect the focal length of the optical lens assembly.

The detailed optical data of the 5th embodiment are shown in Table 9 and the aspheric surface data are shown in Table 10 below.

TABLE 9

5th Embodiment
f = 2.86 mm, Fno = 2.65, HFOV = 30.1 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Ape. Stop | Plano | −0.081 | | | | |
| 2 | Lens 1 | 1.198 (ASP) | 0.469 | Plastic | 1.544 | 55.9 | 2.26 |
| 3 | | 40.000 (ASP) | 0.727 | | | | |
| 4 | Lens 2 | −7.800 (ASP) | 1.204 | Plastic | 1.640 | 23.3 | −3.47 |
| 5 | | 3.287 (ASP) | 0.300 | | | | |

TABLE 9-continued

5th Embodiment
f = 2.86 mm, Fno = 2.65, HFOV = 30.1 deg.

| Surface # | | Curvature Radius | Thickness | Material | Index | Abbe # | Focal Length |
|---|---|---|---|---|---|---|---|
| 6 | IR-cut filter | Plano | 0.200 | Glass | 1.517 | 64.2 | — |
| 7 | | Plano | 0.321 | | | | |
| 8 | Image | Plano | — | | | | |

Reference wavelength (d-line) is 587.6 nm.

TABLE 10

Aspheric Coefficients

| Surface # | 2 | 3 | 4 | 5 |
|---|---|---|---|---|
| k = | −1.2343E+00 | −1.0000E+00 | 2.2607E+00 | 3.7183E+00 |
| A4 = | −9.1659E−02 | −9.3633E−02 | −4.0286E−01 | −2.6132E−01 |
| A6 = | 1.0572E+00 | −1.1281E+00 | −1.4048E+00 | 2.1298E−01 |
| A8 = | −7.6786E+00 | 3.3364E+00 | 5.7029E+00 | −1.9223E−01 |
| A10 = | 2.2198E+01 | −6.2103E+00 | −1.0477E+01 | 1.2442E−01 |
| A12 = | −2.6706E+01 | 2.4338E+00 | −4.8128E−01 | −5.2787E−02 |
| A14 = | | | | 9.6901E−03 |

In the optical lens assembly according to the 5th embodiment, the definitions of f, Fno, HFOV, V1, V2, CT1, CT2, R2, R3, R4, f2, T12, SD, TD, and SAG22 are the same as those stated in the 1st embodiment with corresponding values for the 5th embodiment. Moreover, these parameters can be calculated from Table 9 and Table 10 as the following values and satisfy the following relationships:

| | |
|---|---|
| f [mm] | 2.86 |
| Fno | 2.65 |
| HFOV [deg.] | 30.1 |
| (V1 + V2)/(V1 − V2) | 2.43 |
| CT2/CT1 | 2.57 |
| R3/R2 | −0.20 |
| f/f2 | −0.83 |
| T12/f | 0.25 |
| SD/TD | 0.97 |
| f/R4 | 0.87 |
| SAG22/CT2 | −0.07 |

6th Embodiment

Figure 11:
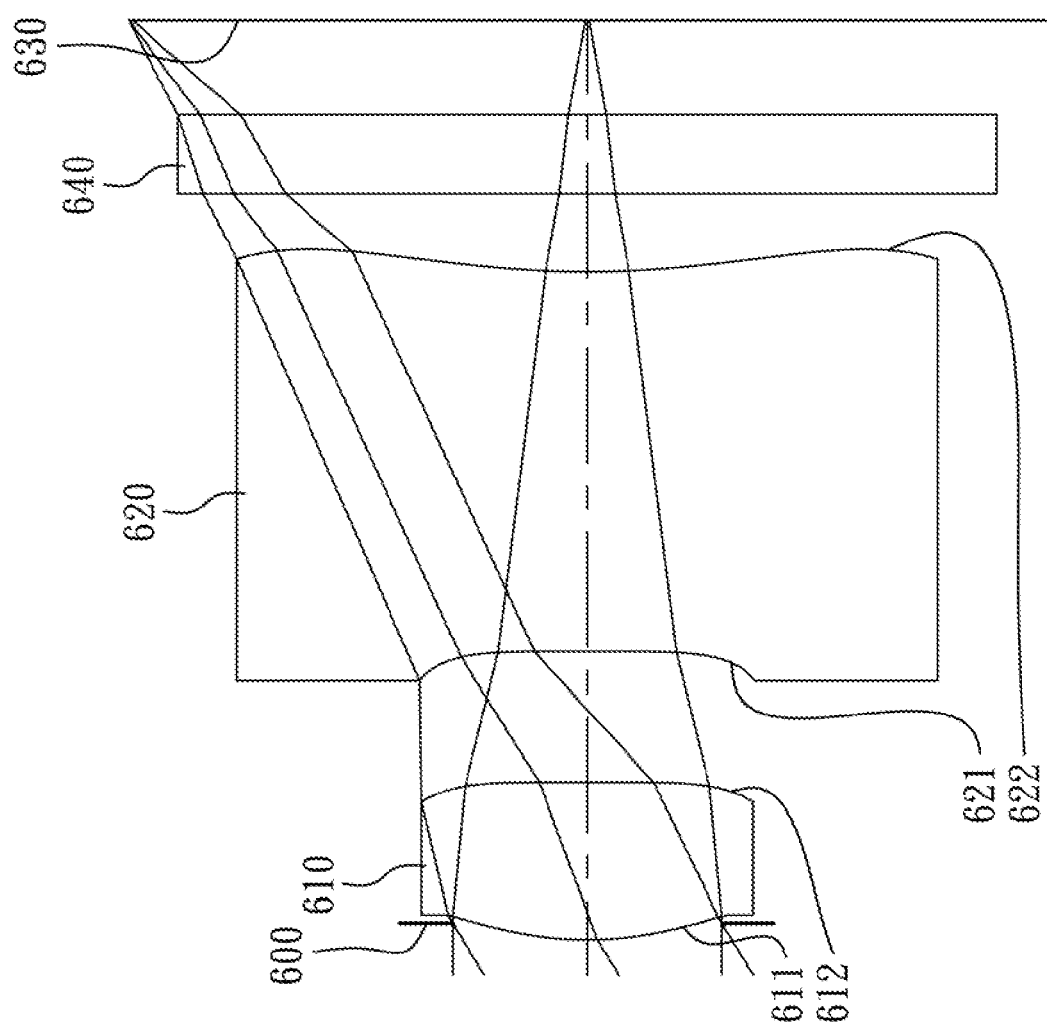
FIG. 11 is a schematic view of an optical lens assembly according to the 6th embodiment of the present disclosure.
Figure 12:
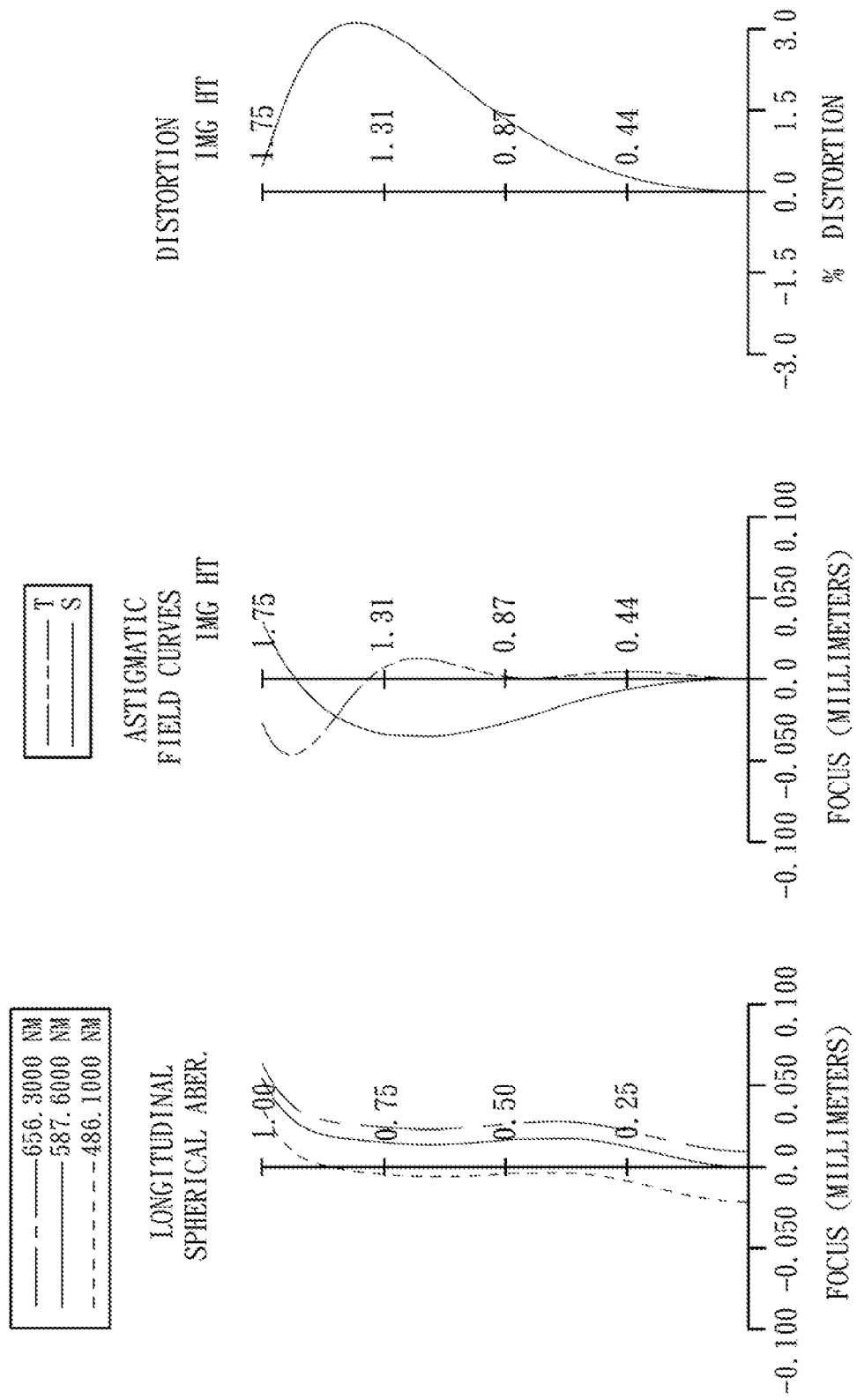
FIG. 12 shows spherical aberration curves, astigmatic field curves and a distortion curve of the optical lens assembly according to the 6th embodiment.

FIG. 11 is a schematic view of an optical lens assembly according to the 6th embodiment of the present disclosure. FIG. 12 shows spherical aberration curves, astigmatic field curves and a distortion curve of the optical lens assembly according to the 6th embodiment. In FIG. 11, the optical lens assembly includes, in order from an object side to an image side, an aperture stop 600, the first lens element 610, the second lens element 620, an IR-cut filter 640, and an image plane 630.

The first lens element 610 with positive refractive power has an object-side surface 611 being convex at a paraxial region and an image-side surface 612 being concave at a paraxial region. The first lens element 610 is made of plastic material with the object-side surface 611 and the image-side surface 612 being aspheric.

The second lens element 620 with negative refractive power has an object-side surface 621 being convex at a paraxial region and an image-side surface 622 being concave at a paraxial region and being convex at a peripheral region. The second lens element 620 is made of plastic material with the object-side surface 621 and the image-side surface 622 being aspheric.

The IR-cut filter 640 is made of glass material, wherein the IR-cut filter 640 is located between the second lens element 620 and the image plane 630, and will not affect the focal length of the optical lens assembly.

The detailed optical data of the 6th embodiment are shown in Table 11 and the aspheric surface data are shown in Table 12 below.

TABLE 11

6th Embodiment
f = 2.88 mm, Fno = 2.80, HFOV = 31.1 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Ape. Stop | Plano | −0.063 | | | | |
| 2 | Lens 1 | 1.351 (ASP) | 0.601 | Plastic | 1.544 | 55.9 | 2.58 |
| 3 | | 31.318 (ASP) | 0.497 | | | | |
| 4 | Lens 2 | 29.796 (ASP) | 1.451 | Plastic | 1.640 | 23.3 | −6.29 |
| 5 | | 3.477 (ASP) | 0.300 | | | | |

TABLE 11-continued

6th Embodiment
f = 2.88 mm, Fno = 2.80, HFOV = 31.1 deg.

| Surface # | | Curvature Radius | Thickness | Material | Index | Abbe # | Focal Length |
|---|---|---|---|---|---|---|---|
| 6 | IR-cut filter | Plano | 0.300 | Glass | 1.517 | 64.2 | — |
| 7 | | Plano | 0.363 | | | | |
| 8 | Image | Plano | — | | | | |

Reference wavelength (d-line) is 587.6 nm.

TABLE 12

Aspheric Coefficients

| Surface # | 2 | 3 | 4 | 5 |
|---|---|---|---|---|
| k = | −1.4332E+00 | −1.0000E+00 | 5.0000E+01 | −2.5525E+01 |
| A4 = | −8.9630E−02 | −3.3025E−01 | −4.2473E−01 | −2.4536E−03 |
| A6 = | 7.0199E−01 | −9.5569E−02 | 5.8610E−01 | −8.9757E−03 |
| A8 = | −6.0871E+00 | −8.7432E−01 | −5.9430E+00 | −1.8666E−02 |
| A10 = | 1.9161E+01 | −1.3199E−01 | 1.7413E+01 | 1.3224E−02 |
| A12 = | −2.7566E+01 | 1.3923E−01 | −2.5525E+01 | −4.4429E−03 |
| A14 = | | | | 6.5370E−04 |

In the optical lens assembly according to the 6th embodiment, the definitions of f, Fno, HFOV, V1, V2, CT1, CT2, R2, R3, R4, f2, T12, SD, TD, and SAG22 are the same as those stated in the 1st embodiment with corresponding values for the 6th embodiment. Moreover, these parameters can be calculated from Table 11 and Table 12 as the following values and satisfy the following relationships:

| f [mm] | 2.88 |
|---|---|
| Fno | 2.80 |
| HFOV [deg.] | 31.1 |
| (V1 + V2)/(V1 − V2) | 2.43 |
| CT2/CT1 | 2.41 |
| R3/R2 | 0.95 |
| f/f2 | −0.46 |
| T12/f | 0.17 |
| SD/TD | 0.98 |
| f/R4 | 0.83 |
| SAG22/CT2 | 0.03 |

7th Embodiment

Figure 13:
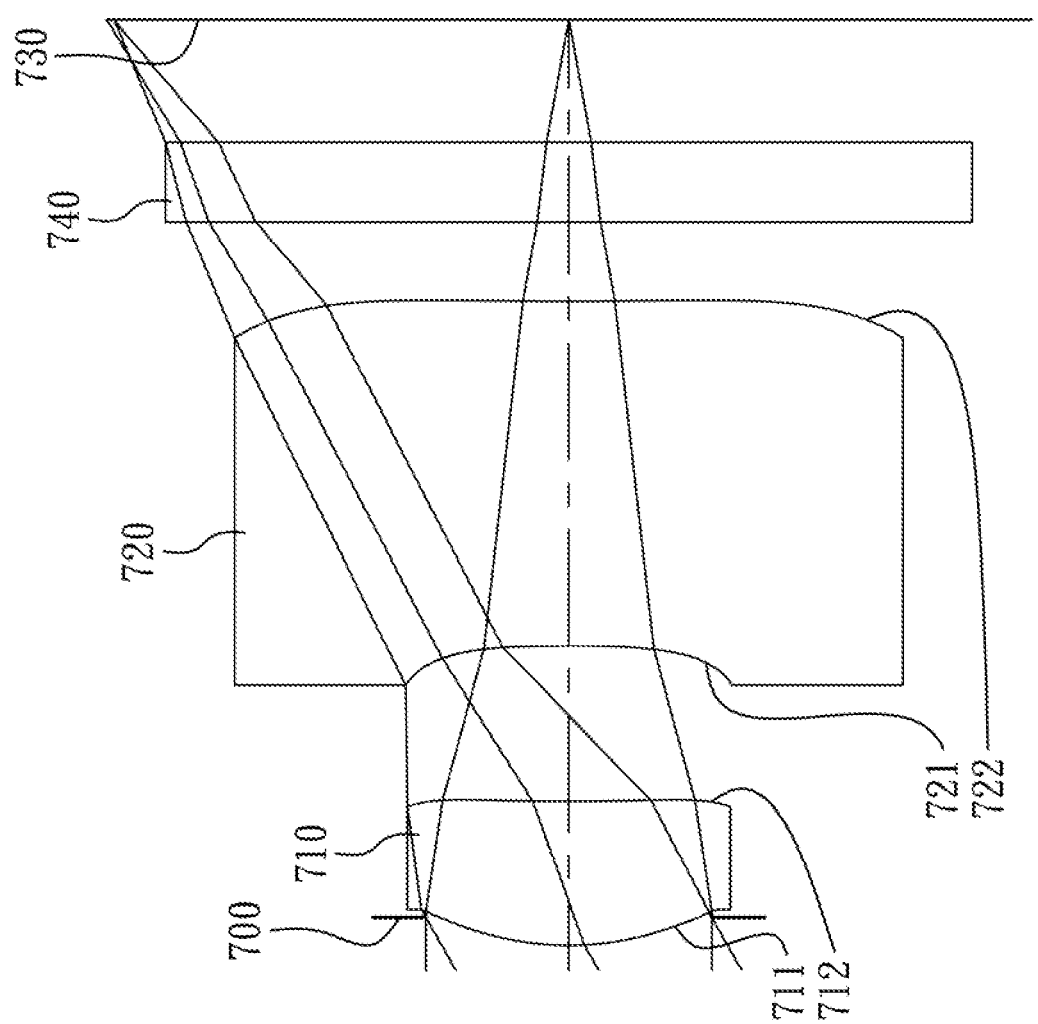
FIG. 13 is a schematic view of an optical lens assembly according to the 7th embodiment of the present disclosure.
Figure 14:
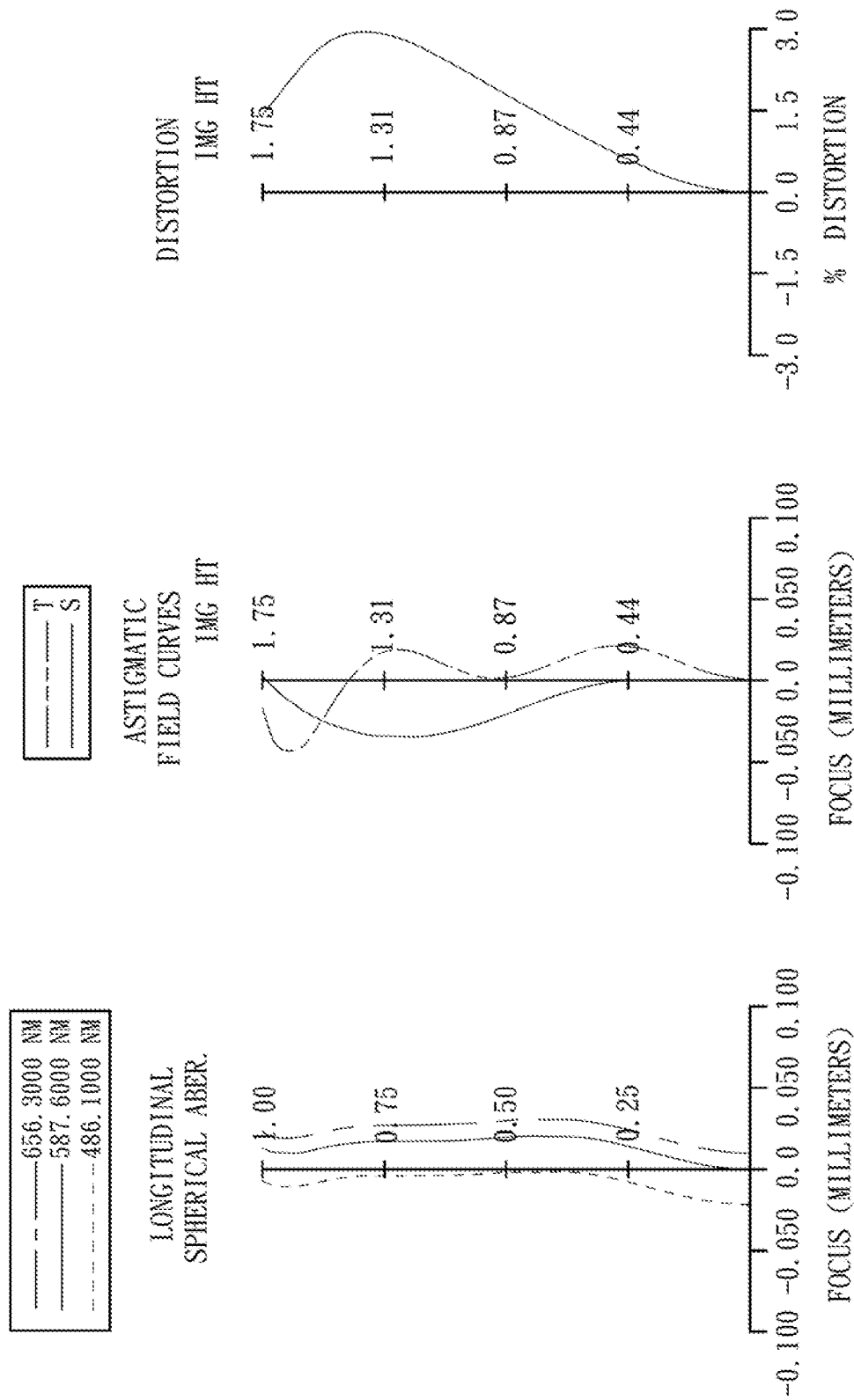
FIG. 14 shows spherical aberration curves, astigmatic field curves and a distortion curve of the optical lens assembly according to the 7th embodiment.

FIG. 13 is a schematic view of an optical lens assembly according to the 7th embodiment of the present disclosure. FIG. 14 shows spherical aberration curves, astigmatic field curves and a distortion curve of the optical lens assembly according to the 7th embodiment. In FIG. 13, the optical lens assembly includes, in order from an object side to an image side, an aperture stop 700, the first lens element 710, the second lens element 720, an IR-cut filter 740, an image plane 730.

The first lens element 710 with positive refractive power has an object-side surface 711 being convex at a paraxial region and an image-side surface 712 being concave at a paraxial region. The first lens element 710 is made of glass material with the object-side surface 711 and the image-side surface 712 being aspheric.

The second lens element 720 with negative refractive power has an object-side surface 721 being concave at a paraxial region and an image-side surface 722 being concave at a paraxial region and being convex at a peripheral region. The second lens element 720 is made of plastic material with the object-side surface 721 and the image-side surface 722 being aspheric.

The IR-cut filter 740 is made of glass material, wherein the IR-cut filter 740 is located between the second lens element 720 and the image plane 730, and will not affect the focal length of the optical lens assembly.

The detailed optical data of the 7th embodiment are shown in Table 13 and the aspheric surface data are shown in Table 14 below.

TABLE 13

7th Embodiment
f = 3.03 mm, Fno = 2.80, HFOV = 29.5 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Ape. Stop | Plano | −0.105 | | | | |
| 2 | Lens 1 | 1.128 (ASP) | 0.545 | Glass | 1.544 | 55.9 | 2.42 |
| 3 | | 6.585 (ASP) | 0.589 | | | | |
| 4 | Lens 2 | −5.184 (ASP) | 1.307 | Plastic | 1.640 | 23.3 | −6.14 |
| 5 | | 17.766 (ASP) | 0.300 | | | | |

TABLE 13-continued

7th Embodiment
f = 3.03 mm, Fno = 2.80, HFOV = 29.5 deg.

| Surface # | | Curvature Radius | Thickness | Material | Index | Abbe # | Focal Length |
|---|---|---|---|---|---|---|---|
| 6 | IR-cut filter | Plano | 0.300 | Glass | 1.517 | 64.2 | — |
| 7 | | Plano | 0.468 | | | | |
| 8 | Image | Plano | — | | | | |

Reference wavelength (d-line) is 587.6 nm.

TABLE 14

Aspheric Coefficients

| Surface # | 2 | 3 | 4 | 5 |
|---|---|---|---|---|
| k = | −7.4980E−01 | −1.0000E+00 | 8.9102E+00 | −10000E+02 |
| A4 = | −3.3271E−02 | −1.6447E−01 | −4.6116E−01 | −4.4469E−02 |
| A6 = | 5.4470E−01 | −1.7290E−03 | 1.4407E+00 | −9.7257E−03 |
| A8 = | −4.1120E+00 | −6.4497E−01 | −1.3298E+01 | −1.0913E−02 |
| A10 = | 1.1673E+01 | −2.0187E−01 | 4.2624E+01 | 1.2951E−02 |
| A12 = | −1.4677E+01 | −5.3695E−01 | −6.0932E+01 | −9.2948E−03 |
| A14 = | | | | 2.4667E−03 |

In the optical lens assembly according to the 7th embodiment, the definitions of f, Fno, HFOV, V1, V2, CT1, CT2, R2, R3. R4, f2, T12, SD, TD, and SAG22 are the same as those stated in the 1st embodiment with corresponding values for the 7th embodiment. Moreover, these parameters can be calculated from Table 13 and Table 14 as the following values and satisfy the following relationships:

| | |
|---|---|
| f [mm] | 3.03 |
| Fno | 2.80 |
| HFOV [deg.] | 29.5 |
| (V1 + V2)/(V1 − V2) | 2.43 |
| CT2/CT1 | 2.40 |
| R3/R2 | −0.79 |
| f/f2 | −0.49 |
| T12/f | 0.19 |
| SD/TD | 0.96 |
| f/R4 | 0.17 |
| SAG22/CT2 | −0.11 |

8th Embodiment

Figure 15:
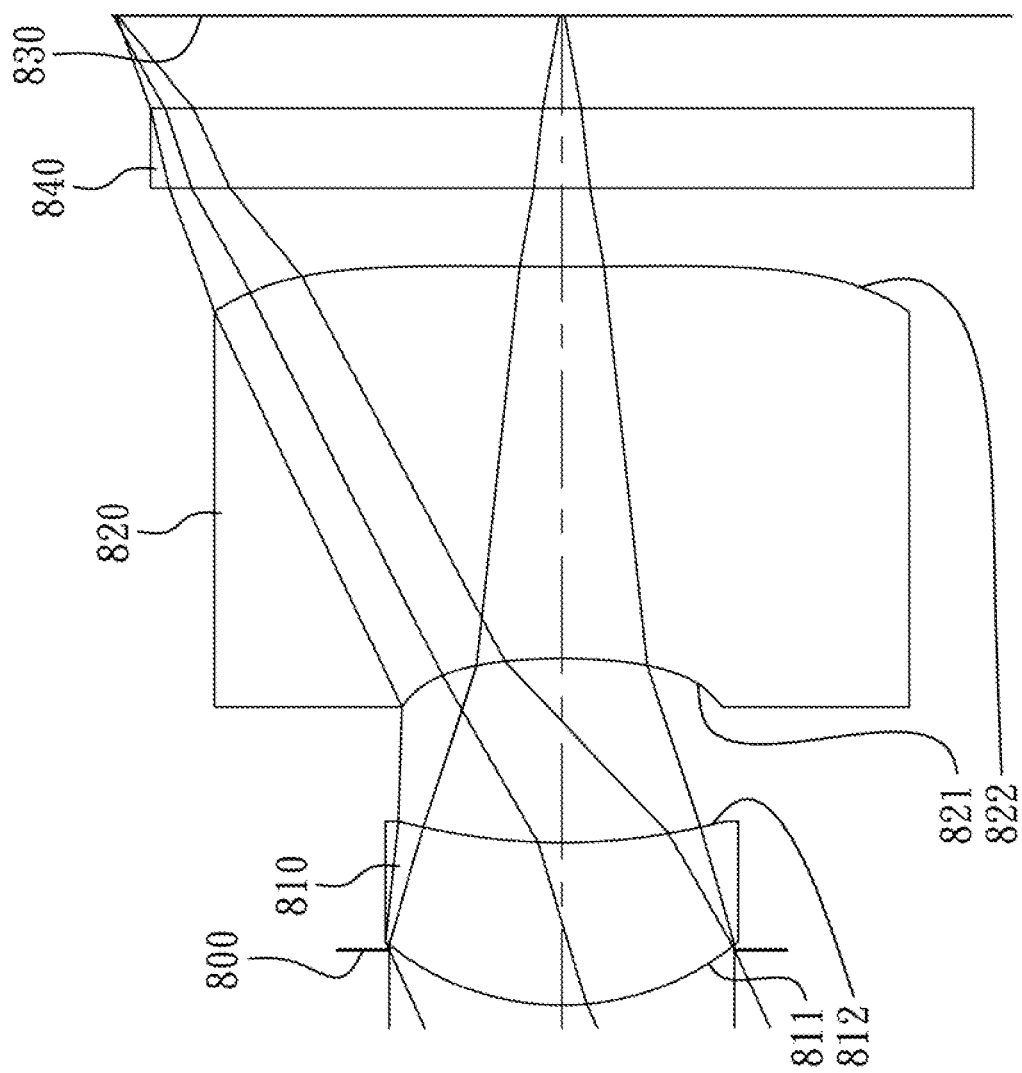
FIG. 15 is a schematic view of an optical lens assembly according to the 8th embodiment of the present disclosure.
Figure 16:
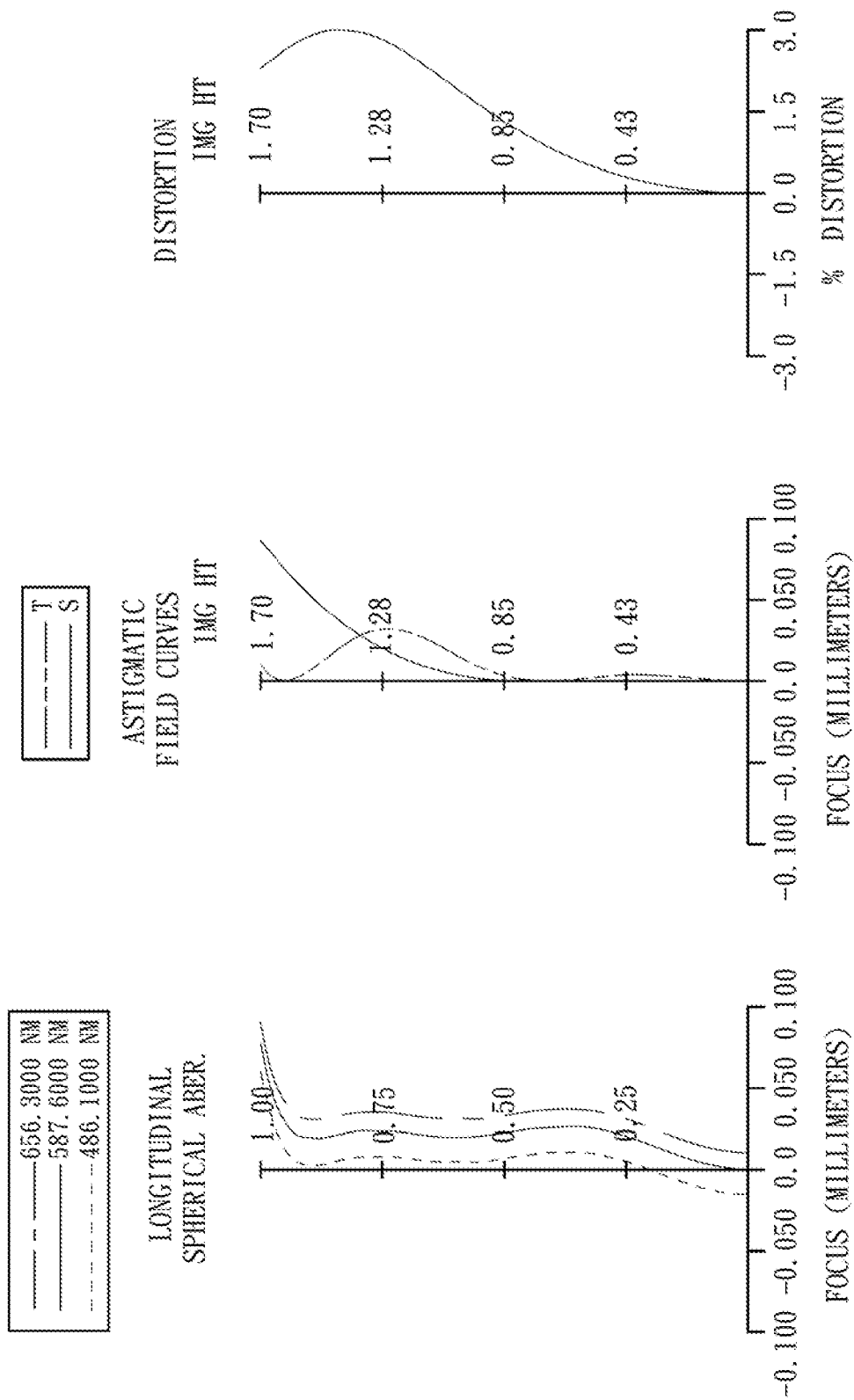
FIG. 16 shows spherical aberration curves, astigmatic field curves and a distortion curve of the optical lens assembly according to the 8th embodiment.

FIG. 15 is a schematic view of an optical lens assembly according to the 8th embodiment of the present disclosure. FIG. 16 shows spherical aberration curves, astigmatic field curves and a distortion curve of the optical lens to assembly according to the 8th embodiment. In FIG. 15, the optical lens assembly includes, in order from an object side to an image side, an aperture stop 800, the first lens element 810, the second lens element 820, an IR-cut filter 840, and an image plane 830.

The first lens element 810 with positive refractive power has an object-side surface 811 being convex at a paraxial region and an image-side surface 812 being concave at a paraxial region. The first lens element 810 is made of glass material with the object-side surface 811 and the image-side surface 812 being aspheric.

The second lens element 820 with negative refractive power has an object-side surface 821 being concave at a paraxial region and an image-side surface 822 being concave at a paraxial region and being convex at a peripheral region. The second lens element 820 is made of plastic material with the object-side surface 821 and the image-side surface 822 being aspheric.

The IR-cut filter 840 is made of glass material, wherein the IR-cut filter 840 is located between the second lens element 820 and the image plane 830, and will not affect the focal length of the optical lens assembly.

The detailed optical data of the 8th embodiment are shown in Table 15 and the aspheric surface data are shown in Table 16 below.

TABLE 15

8th Embodiment
f = 3.66 mm, Fno = 2.80, HFOV = 24.3 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Ape. Stop | Plano | −0.212 | | | | |
| 2 | Lens 1 | 1.033 (ASP) | 0.619 | Glass | 1.632 | 63.8 | 2.41 |
| 3 | | 2.458 (ASP) | 0.695 | | | | |
| 4 | Lens 2 | −2.335 (ASP) | 1.485 | Plastic | 1.650 | 21.4 | −3.13 |
| 5 | | 19.508 (ASP) | 0.300 | | | | |

TABLE 15-continued

8th Embodiment
f = 3.66 mm, Fno = 2.80, HFOV = 24.3 deg.

| Surface # | | Curvature Radius | Thickness | Material | Index | Abbe # | Focal Length |
|---|---|---|---|---|---|---|---|
| 6 | IR-cut filter | Plano | 0.300 | Glass | 1.517 | 64.2 | — |
| 7 | | Plano | 0.354 | | | | |
| 8 | Image | Plano | — | | | | |

Reference wavelength (d-line) is 587.6 nm

TABLE 16

Aspheric Coefficients

| Surface # | 2 | 3 | 4 | 5 |
|---|---|---|---|---|
| k = | −5.1544E−01 | −1.0000E+00 | 4.4250E+00 | 1.1645E+01 |
| A4 = | 3.1103E−02 | 5.3334E−02 | −3.8492E−01 | −8.8844E−02 |
| A6 = | 3.2948E−01 | −1.9822E−01 | 9.3054E−01 | 6.9306E−02 |
| A8 = | −1.4653E+00 | 9.3872E−01 | −1.0576E+01 | −7.7677E−02 |
| A10 = | 3.4686E+00 | −2.0621E+00 | 3.6352E+01 | 4.2837E−02 |
| A12 = | −2.9986E+00 | 7.9430E−01 | −5.6645E+01 | −1.3447E−02 |
| A14 = | | | | 1.8681E−03 |

In the optical lens assembly according to the 8th embodiment, the definitions of f, Fno, HFOV, V1, V2, CT1, CT2, R2, R3, R4, f2, T12, SD, TD, and SAG22 are the same as those stated in the 1st embodiment with corresponding values for the 8th embodiment. Moreover, these parameters can be calculated from Table 15 and Table 16 as the following values and satisfy the following relationships:

| | |
|---|---|
| f [mm] | 3.66 |
| Fno | 2.80 |
| HFOV [deg.] | 24.3 |
| (V1 + V2)/(V1 − V2) | 2.01 |
| CT2/CT1 | 2.40 |
| R3/R2 | −0.95 |
| f/f2 | −1.17 |
| T12/f | 0.19 |
| SD/TD | 0.92 |
| f/R4 | 0.19 |
| SAG22/CT2 | −0.11 |

9th Embodiment

Figure 17:
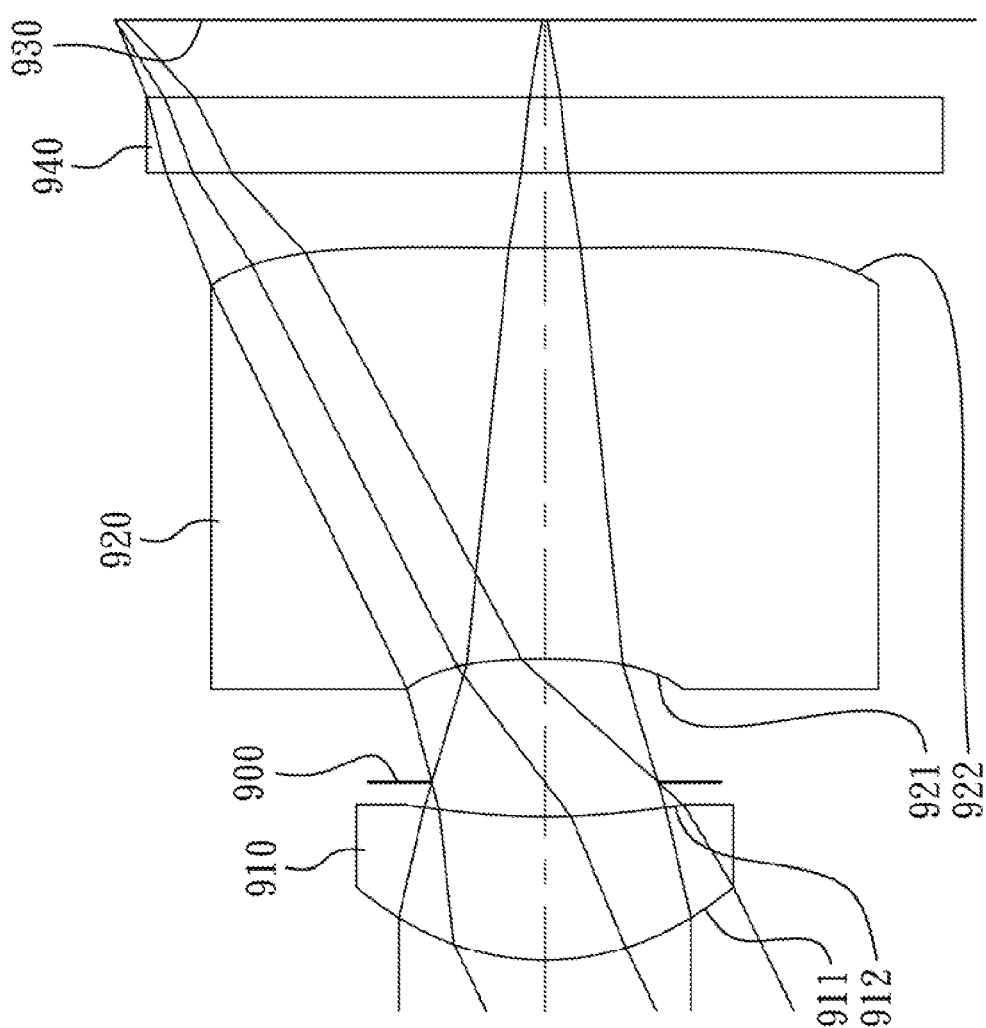
FIG. 17 is a schematic view of an optical lens assembly according to the 9th embodiment of the present disclosure.
Figure 18:
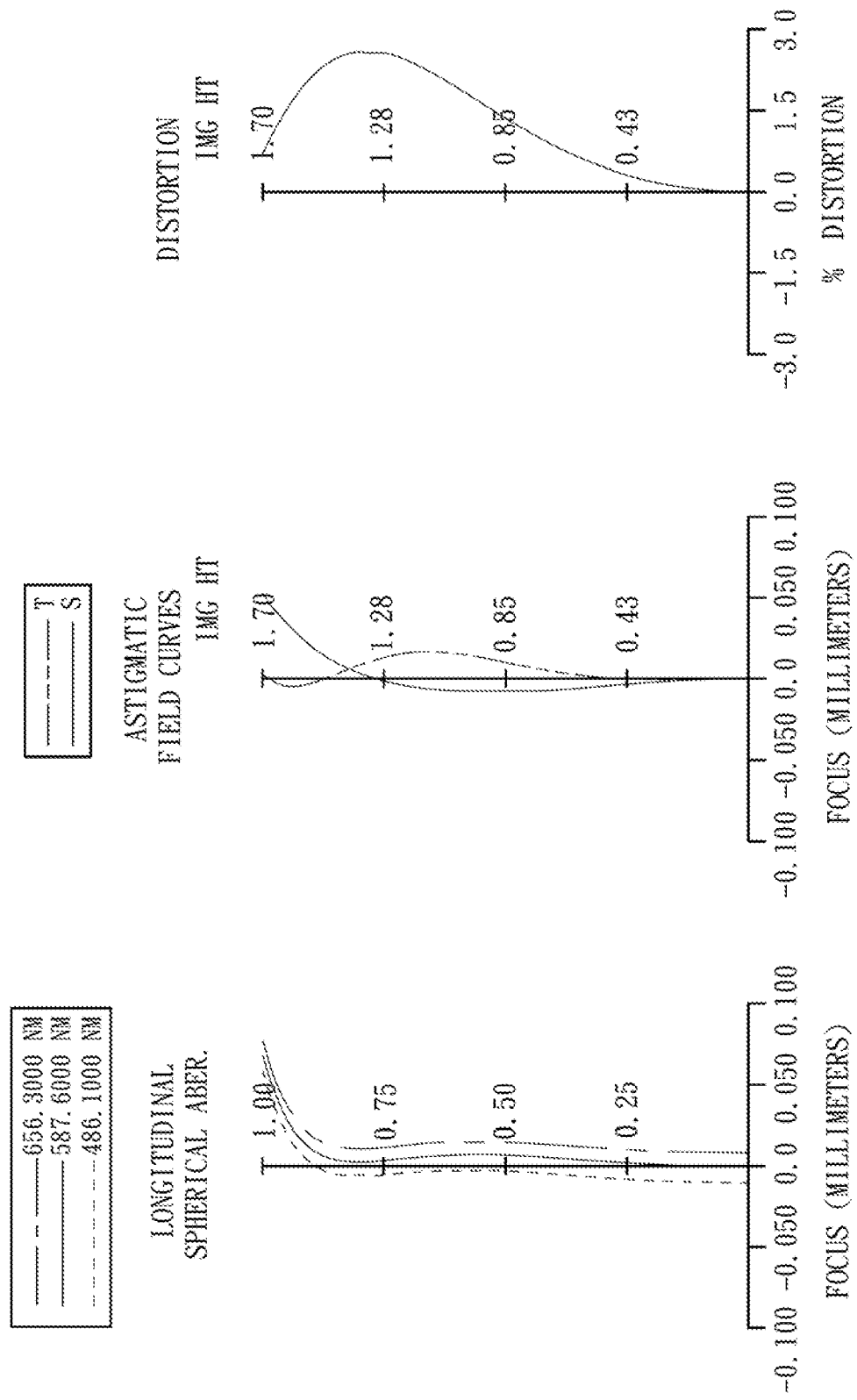
FIG. 18 shows spherical aberration curves, astigmatic field curves and a distortion curve of the optical lens assembly according to the 9th embodiment.

FIG. 17 is a schematic view of an optical lens assembly according to the 9th embodiment of the present disclosure. FIG. 18 shows spherical aberration curves, astigmatic field curves and a distortion curve of the optical lens assembly according to the 9th embodiment. In FIG. 17, the optical lens assembly includes, in order from an object side to an image side, the first lens element 910, an aperture stop 900, the second lens element 920, an IR-cut filter 940, and an image plane 930.

The first lens element 910 with positive refractive power has an object-side surface 911 being convex at a paraxial region and an image-side surface 912 being concave at a paraxial region. The first lens element 910 is made of glass material with the object-side surface 911 and the image-side surface 912 being aspheric.

The second lens element 920 with negative refractive power has an object-side surface 921 being concave at a paraxial region and an image-side surface 922 being concave at a paraxial region and being convex at a peripheral region. The second lens element 920 is made of plastic material with the object-side surface 921 and the image-side surface 922 being aspheric.

The IR-cut filter 940 is made of glass material, wherein the IR-cut filter 940 is located between the second lens element 920 and the image plane 930, and will not affect the focal length of the optical lens assembly.

The detailed optical data of the 9th embodiment are shown in Table 17 and the aspheric surface data are shown in Table 18 below.

TABLE 17

9th Embodiment
f = 3.47 mm, Fno = 3.00, HFOV = 25.9 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 1.052 (ASP) | 0.570 | Glass | 1.632 | 63.8 | 2.33 |
| 2 | | 2.924 (ASP) | 0.136 | | | | |
| 3 | Ape. Stop | Plano | 0.486 | | | | |
| 4 | Lens 2 | −2.544 (ASP) | 1.625 | Plastic | 1.650 | 21.4 | −3.37 |
| 5 | | 19.508 (ASP) | 0.300 | | | | |

TABLE 17-continued

9th Embodiment
f = 3.47 mm, Fno = 3.00, HFOV = 25.9 deg.

| Surface # | | Curvature Radius | Thickness | Material | Index | Abbe # | Focal Length |
|---|---|---|---|---|---|---|---|
| 6 | IR-cut filter | Plano | 0.300 | Glass | 1.517 | 64.2 | — |
| 7 | | Plano | 0.306 | | | | |
| 8 | Image | Plano | — | | | | |

Reference wavelength (d-line) is 587.6 nm.

TABLE 18

Aspheric Coefficients

| Surface # | 1 | 2 | 4 | 5 |
|---|---|---|---|---|
| k = | −5.6305E−01 | −1.0000E+00 | 9.6443E+00 | −6.8031E+01 |
| A4 = | 3.9604E−02 | −4.7115E−02 | −3.2623E−01 | −6.2307E−02 |
| A6 = | 4.1865E−02 | 1.0792E−01 | 1.0185E−01 | 4.1980E−02 |
| A8 = | −3.1393E−02 | −1.5735E+00 | −3.9510E+00 | −5.2385E−02 |
| A10 = | −2.2265E−01 | 2.7079E+00 | 1.3200E+01 | 2.8303E−02 |
| A12 = | 2.0295E−01 | 1.3493E+00 | −3.4344E+01 | −8.9038E−03 |
| A14 = | | | | 1.2188E−03 |

In the optical lens assembly according to the 9th embodiment, the definitions of f, Fno, HFOV, V1, V2, CT1, CT2, R2, R3, R4, f2, T12, SD, TD, and SAG22 are the same as those stated in the 1st embodiment with corresponding values for the 9th embodiment. Moreover, these parameters can be calculated from Table 17 and Table 18 as the following values and satisfy the following relationships:

| f [mm] | 3.47 |
|---|---|
| Fno | 3.00 |
| HFOV [deg.] | 25.9 |
| (V1 + V2)/(V1 − V2) | 2.01 |
| CT2/CT1 | 2.85 |
| R3/R2 | −0.87 |
| f/f2 | −1.03 |
| T12/f | 0.18 |
| SD/TD | 0.75 |
| f/R4 | 0.18 |
| SAG22/CT2 | −0.09 |

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. An optical lens assembly comprising, in order from an object side to an image side:
   a first lens element with positive refractive power having an object-side surface being convex at a paraxial region and an image-side surface being concave at a paraxial region; and
   a second lens element with negative refractive power made of plastic material and having an image-side surface being concave at a paraxial region and being convex at a peripheral region, wherein an object-side surface and the image-side surface of the second lens element are aspheric;
   wherein the optical lens assembly has a total of two lens elements with refractive power, an Abbe number of the first lens element is V1, an Abbe number of the second lens element is V2, a central thickness of the first lens element is CT1, a central thickness of the second lens element is CT2, a curvature radius of the image-side surface of the first lens element is R2, a curvature radius of the object-side surface of the second lens element is R3, and the following relationships are satisfied:

$2.0<(V1+V2)/(V1-V2)<5.0$;

$1.85<CT2/CT1<4.0$; and $-1.5<R3/R2<1.5$.

2. The optical lens assembly of claim 1, wherein the curvature radius of the image-side surface of the first lens element is R2, the curvature radius of the object-side surface of the second lens element is R3, and the following relationship is satisfied:

$-1.5<R3/R2<0$.

3. The optical lens assembly of claim 2, wherein the Abbe number of the first lens element is V1, the Abbe number of the second lens element is V2, and the following relationship is satisfied:

$2.0<(V1+V2)/(V1-V2)<3.0$.

4. The optical lens assembly of claim 1, wherein the Abbe number of the first lens element is V1, the Abbe number of the second lens element is V2, and the following relationship is satisfied:

$2.0<(V1+V2)/(V1-V2)<2.6$.

5. The optical lens assembly of claim 2, further comprising:
   a stop, wherein an axial distance between the stop and the image-side surface of the second lens element is SD, an axial distance between the object-side surface of the first lens element and the image-side surface of the second lens element is TD, and the following relationship is satisfied:

$0.90<SD/TD<1.10$.

6. The optical lens assembly of claim 5, wherein an axial distance between the first lens element and the second lens element is T12, a focal length of the optical lens assembly is f, and the following relationship is satisfied:

$$0.16 < T12/f < 0.30.$$

7. The optical lens assembly of claim 5, wherein the central thickness of the first lens element is CT1, the central thickness of the second lens element is CT2, and the following relationship is satisfied:

$$2.1 < CT2/CT1 < 4.0.$$

8. The optical lens assembly of claim 2, wherein a focal length of the optical lens assembly is f, a curvature radius of the image-side surface of the second lens element is R4, and the following relationship is satisfied:

$$0.1 < f/R4 < 1.2.$$

9. The optical lens assembly of claim 2, wherein a focal length of the optical lens assembly is f, a focal length of the second lens element is f2, and the following relationship is satisfied:

$$-1.2 < f/f2 < -0.4.$$

10. The optical lens assembly of claim 2, wherein a distance in parallel with the optical axis from the on-axis vertex on the image-side surface of the second lens element to the maximum effective diameter position on the image-side surface of the second lens element is SAG22, the central thickness of the second lens element is CT2, and the following relationship is satisfied:

$$-0.60 < SAG22/CT2 < 0.$$

11. An optical lens assembly comprising, in order from an object side to an image side:
a stop;
a first lens element with positive refractive power having an object-side surface being convex at a paraxial region and an image-side surface being concave at a paraxial region; and
a second lens element with negative refractive power made of plastic material and having an image-side surface being concave at a paraxial region and being convex at a peripheral region, and an object-side surface and the image-side surface of the second lens element are aspheric;
wherein the optical lens assembly has a total of two lens elements with refractive power, an Abbe number of the first lens element is V1, an Abbe number of the second lens element is V2, a central thickness of the first lens element is CT1, a central thickness of the second lens element is CT2, a curvature radius of the image-side surface of the first lens element is R2, a curvature radius of the object-side surface of the second lens element is R3, an axial distance between the stop and the image-side surface of the second lens element is SD, an axial distance between the object-side surface of the first lens element and the image-side surface of the second lens element is TD, and the following relationships are satisfied:

$$2.0 < (V1+V2)/(V1-V2) < 5.0;$$

$$1.65 < CT2/CT1 < 4.0;$$

$$-1.5 < R3/R2 < 1.5; \text{ and}$$

$$0.90 < SD/TD < 1.1.$$

12. The optical lens assembly of claim 11, wherein the curvature radius of the image-side surface of the first lens element is R2, the curvature radius of the object-side surface of the second lens element is R3, and the following relationship is satisfied:

$$-1.5 < R3/R2 < 0.$$

13. The optical lens assembly of claim 12, wherein the Abbe number of the first lens element is V1, the Abbe number of the second lens element is V2, and the following relationship is satisfied:

$$2.0 < (V1+V2)/(V1-V2) < 3.0.$$

14. The optical lens assembly of claim 13, wherein the central thickness of the first lens element is CT1, the central thickness of the second lens element is CT2, and the following relationship is satisfied:

$$1.85 < CT2/CT1 < 4.0.$$

15. The optical lens assembly of claim 12, wherein the Abbe number of the first lens element is V1, the Abbe number of the second lens element is V2, and the following relationship is satisfied:

$$2.0 < (V1+V2)/(V1-V2) < 2.6.$$

16. The optical lens assembly of claim 12, wherein the central thickness of the first lens element is CT1, the central thickness of the second lens element is CT2, and the following relationship is satisfied:

$$2.1 < CT2/CT1 < 4.0.$$

17. The optical lens assembly of claim 12, wherein a focal length of the optical lens assembly is f, a focal length of the second lens element is f2, and the following relationship is satisfied:

$$-1.2 < f/f2 < -0.4.$$

18. The optical lens assembly of claim 12, wherein a distance in parallel with the optical axis from the on-axis vertex on the image-side surface of the second lens element to the maximum effective diameter position on the image-side surface of the second lens element is SAG22, the central thickness of the second lens element is CT2, and the following relationship is satisfied:

$$-0.60 < SAG22/CT2 < 0.$$

19. The optical lens assembly of claim 12, wherein a focal length of the optical lens assembly is f, a curvature radius of the image-side surface of the second lens element is R4, and the following relationship is satisfied:

$$0.1 < f/R4 < 1.2.$$

20. The optical lens assembly of claim 10, wherein the central thickness of the first lens element is CT1, the central thickness of the second lens element is CT2, and the following relationship is satisfied:

$$2.1 < CT2/CT1 < 4.0.$$

21. The optical lens assembly of claim 10, wherein the Abbe number of the first lens element is V1, the Abbe number of the second lens element is V2, and the following relationship is satisfied:

$$2.0 < (V1+V2)/(V1-V2) < 3.0.$$

* * * * *